US012782145B2

(12) United States Patent
Chen et al.

(10) Patent No.: US 12,782,145 B2
(45) Date of Patent: Nov. 3, 2026

(54) VEHICLE POSITIONING METHOD AND APPARATUS

(71) Applicant: Yinwang Intelligent Technologies Co., Ltd., Shenzhen (CN)

(72) Inventors: Chaoyue Chen, Shenzhen (CN); Weilong Hu, Shenzhen (CN); Shunyao Wang, Shenzhen (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 245 days.

(21) Appl. No.: 18/299,723

(22) Filed: Apr. 13, 2023

(65) Prior Publication Data

US 2023/0251095 A1 Aug. 10, 2023

Related U.S. Application Data

(63) Continuation of application No. PCT/CN2021/124445, filed on Oct. 18, 2021.

(30) Foreign Application Priority Data

Oct. 30, 2020 (CN) ......................... 202011194287.8

(51) Int. Cl.
*G01C 21/28* (2006.01)

(52) U.S. Cl.
CPC .................................... *G01C 21/28* (2013.01)

(58) Field of Classification Search
None
See application file for complete search history.

(56) References Cited

U.S. PATENT DOCUMENTS

2009/0099773 A1* 4/2009 Watanabe ............... G01S 19/40 701/472
2009/0138199 A1 5/2009 Bonanni et al.
(Continued)

FOREIGN PATENT DOCUMENTS

CN 104360366 A 2/2015
CN 106443737 A 2/2017
(Continued)

OTHER PUBLICATIONS

K. Jo, M. Lee and M. Sunwoo, “Road Slope Aided Vehicle Position Estimation System Based on Sensor Fusion of GPS and Automotive Onboard Sensors,” in IEEE Transactions on Intelligent Transportation Systems, vol. 17, No. 1, pp. 250-263, Jan. 2016, doi: 10.1109/TITS.2015.2464697. (Year: 2016).*

*Primary Examiner* — Faris S Almatrahi
*Assistant Examiner* — Selena M Jin
(74) *Attorney, Agent, or Firm* — Leydig, Voit & Mayer, Ltd.

(57) ABSTRACT

In a method for vehicle positioning, a positioning apparatus in a to-be-positioned vehicle obtains a global positioning system (GPS) position covariance of the to-be-positioned vehicle. When the GPS position covariance is less than or equal to a preset position covariance threshold, the apparatus obtains initial position information of the to-be-positioned vehicle and vehicle information of a surrounding vehicle. The apparatus determines a first position reckoning result of the surrounding vehicle based on the initial position information of the to-be-positioned vehicle and the vehicle information of the surrounding vehicle, and determines a second position reckoning result of the to-be-positioned vehicle based on the first position reckoning result.

20 Claims, 7 Drawing Sheets

(56) References Cited

U.S. PATENT DOCUMENTS

| | | | | |
|---|---|---|---|---|
| 2011/0018763 | A1* | 1/2011 | Watanabe | G01S 19/396 342/357.62 |
| 2011/0320121 | A1 | 12/2011 | Kang et al. | |
| 2012/0290146 | A1* | 11/2012 | Dedes | G01C 21/165 701/1 |
| 2013/0116921 | A1* | 5/2013 | Kasargod | G01C 21/165 701/472 |
| 2014/0172287 | A1* | 6/2014 | Ando | G08G 1/09675 701/301 |
| 2015/0156662 | A1* | 6/2015 | Bai | G08G 1/163 370/231 |
| 2015/0262481 | A1* | 9/2015 | Selin | B60W 30/00 701/117 |
| 2016/0272196 | A1* | 9/2016 | Hocking | B60W 30/02 |
| 2016/0297436 | A1* | 10/2016 | Shin | G08G 1/163 |
| 2018/0001894 | A1* | 1/2018 | Masui | B60W 30/16 |
| 2018/0348770 | A1* | 12/2018 | Yasui | B60W 30/18163 |
| 2019/0279501 | A1* | 9/2019 | Bandou | G08G 1/0112 |
| 2019/0293432 | A1* | 9/2019 | Demiral | G01C 22/02 |
| 2020/0124422 | A1* | 4/2020 | Lin Sörstedt | G06V 20/56 |
| 2020/0209883 | A1* | 7/2020 | Kim | G05D 1/028 |
| 2020/0318971 | A1* | 10/2020 | Mori | B60W 30/04 |
| 2021/0141100 | A1* | 5/2021 | Castorena Martinez | G01S 5/0072 |
| 2021/0263165 | A1* | 8/2021 | Zheng | G01S 19/04 |
| 2021/0291856 | A1* | 9/2021 | Uenoyama | B60W 60/001 |
| 2022/0058966 | A1* | 2/2022 | Baranek | G08G 5/723 |
| 2022/0179104 | A1* | 6/2022 | Hamada | G01S 19/50 |
| 2022/0187079 | A1* | 6/2022 | Matsumoto | G01C 21/30 |

FOREIGN PATENT DOCUMENTS

| | | | |
|---|---|---|---|
| CN | 106710281 | A | 5/2017 |
| CN | 104848856 | B | 9/2017 |
| CN | 107657824 | A | 2/2018 |
| CN | 108121003 | A | 6/2018 |
| CN | 108957506 | A | 12/2018 |
| CN | 110687562 | A | 1/2020 |
| CN | 110749328 | A | 2/2020 |
| CN | 111522003 | A | 8/2020 |

* cited by examiner

VEHICLE POSITIONING METHOD AND APPARATUS

CROSS-REFERENCE TO RELATED APPLICATIONS

This application is a continuation of International Application PCT/CN2021/124445, filed on Oct. 18, 2021, which claims priority to Chinese Patent Application 202011194287.8, filed on Oct. 30, 2020. The disclosures of the aforementioned priority applications are hereby incorporated by reference in their entirety.

TECHNICAL FIELD

This application relates to the field of autonomous driving technologies, and in particular, to a vehicle positioning method and apparatus.

BACKGROUND

With support of an Internet of Vehicles technology and an artificial intelligence technology, an autonomous driving technology can improve travel efficiency, reduce energy consumption, and improve security to some extent. The autonomous driving technology has been a complete, secure, and effective cutting-edge technology. A vehicle positioning technology is an important basis and a key technology of an autonomous driving function. A loss of positioning may cause a self-driving car to fail to run normally, and may cause a major accident.

Currently, for autonomous driving positioning, a global positioning system (GPS) and an inertial measurement unit (IMU) is generally used for positioning to obtain a relatively high-precision positioning result. Sometimes, the IMU is constrained by using a laser and vision based simultaneous localization and mapping (SLAM) technology, to correct a vehicle position.

However, the foregoing method is greatly affected by an external environment, and especially in some special scenarios, for example, in a tunnel, a GPS fails, visual and laser features are reduced, and an IMU loses most constraints. Consequently, a positioning result is inaccurate, and it is difficult to implement global positioning of a vehicle.

SUMMARY

Embodiments of this application provide a vehicle positioning method and apparatus, so that when a GPS fails or a vehicle-mounted sensor of a to-be-positioned vehicle is faulty, global positioning information of the to-be-positioned vehicle may be calculated by using vehicle information of a surrounding vehicle, thereby improving accuracy of a vehicle positioning result in a special scenario, and improving robustness of a vehicle positioning system.

According to a first aspect, an embodiment of this application provides a vehicle positioning method, including:

obtaining a global positioning system GPS position covariance of a to-be-positioned vehicle; when the GPS position covariance is less than or equal to a preset position covariance threshold, obtaining initial position information of the to-be-positioned vehicle and vehicle information of a surrounding vehicle, where the surrounding vehicle is a vehicle whose distance from the to-be-positioned vehicle is less than a preset distance threshold, and the vehicle information includes distance information and vehicle speed information; determining a first position reckoning result of the surrounding vehicle based on the initial position information of the to-be-positioned vehicle and the vehicle information of the surrounding vehicle; and determining a second position reckoning result of the to-be-positioned vehicle based on the first position reckoning result.

It should be understood that the to-be-positioned vehicle may be a vehicle that needs to be positioned because a GPS fails in an environment such as a tunnel, a residential area, or an underground parking lot, or may be a vehicle whose vehicle-mounted sensor is faulty and that cannot be positioned by obtaining surrounding environment information. The faulty vehicle-mounted sensor may be a vehicle-mounted sensor such as a laser radar or an ultrasonic radar. A device for obtaining the vehicle information of the surrounding vehicle may be a device such as a vehicle-mounted camera, a millimeter-wave radar sensor, and a vehicle to everything (V2X) broadcast communicator. A device for determining a position reckoning result may be a vehicle-mounted terminal, or may be a device such as a server or a cloud.

In the foregoing method, when the GPS fails or the vehicle-mounted sensor is faulty and vehicle positioning cannot be performed, the positioning information of the to-be-positioned vehicle may be calculated by obtaining information about the surrounding vehicle, so that a possibility of a safety accident caused by a positioning loss of the vehicle can be effectively reduced, and accuracy of a vehicle positioning result can be improved.

In an optional implementation, the vehicle information of the surrounding vehicle further includes identification information of the surrounding vehicle, orientation information of the surrounding vehicle, and information about an angle difference between the surrounding vehicle and the to-be-positioned vehicle, and the orientation information includes yaw angle information of the surrounding vehicle, pitch angle information of the surrounding vehicle, and roll angle information of the surrounding vehicle; the distance information includes information about a horizontal distance between the surrounding vehicle and the to-be-positioned vehicle, and information about a vertical distance between the surrounding vehicle and the to-be-positioned vehicle; and the vehicle speed information includes the vehicle speed information of the surrounding vehicle and yaw angular velocity information of the surrounding vehicle.

In an optional implementation, the determining a first position reckoning result of the surrounding vehicle based on the initial position information of the to-be-positioned vehicle and the vehicle information of the surrounding vehicle includes: establishing a vehicle tracking table based on the vehicle information of the surrounding vehicle; obtaining initial position information of the surrounding vehicle based on the vehicle tracking table and the initial position information of the to-be-positioned vehicle by using an initial position reckoning algorithm; and obtaining the first position reckoning result based on the initial position information of the surrounding vehicle and the vehicle information of the surrounding vehicle by using a first position reckoning algorithm.

In an optional implementation, the initial position information of the surrounding vehicle includes first initial position coordinates ($x_{i\_t0}$, $y_{i\_t0}$, $z_{i\_t0}$, $yaw_{i\_t0}$, $pitch_{i\_t0}$, $roll_{i\_t0}$), the initial position information of the to-be-positioned vehicle includes second initial position coordinates ($x_{t0}$, $y_{t0}$, $z_{t0}$, $yaw_{t0}$, $pitch_{t0}$, $roll_{t0}$), and the initial position reckoning algorithm includes:

$x_{i\_t0}=x_{t0}+lx_{i\_t0}$;

$y_{i\_t0}=y_{t0}+ly_{i\_t0}$;

$z_{i\_t0}=z_{t0}$;

$yaw_{i\_t0}=yaw_{t0}+lyaw_{i\_t0}$;

$pitch_{i\_t0}=pitch_{t0}$; and $roll_{i\_t0}=roll_{t0}$, where $x_{i\_t0}$, $y_{i\_t0}$, $z_{i\_t0}$, $yaw_{i\_t0}$, $pitch_{i\_t0}$, and $roll_{i\_t0}$ respectively represent coordinate information in a preset x-coordinate axis direction, coordinate information in a preset y-coordinate axis direction, coordinate information in a preset z-coordinate axis direction, yaw angle information, pitch angle information, and roll angle information that are of a surrounding vehicle numbered i and that are at an initial moment $t_0$, $x_{t0}$, $y_{t0}$, $z_{t0}$, $yaw_{t0}$, $pitch_{t0}$, and $roll_{t0}$ respectively represent coordinate information in the preset x-coordinate axis direction, coordinate information in the preset y-coordinate axis direction, coordinate information in the preset z-coordinate axis direction, yaw angle information, pitch angle information, and roll angle information that are of the to-be-positioned vehicle at the initial moment $t_0$, $x_{i\_t0}$ and $ly_{i\_t0}$ respectively represent information about a horizontal distance and information about a vertical distance between the surrounding vehicle numbered i and the to-be-positioned vehicle at the initial moment $t_0$, and $lyaw_{i\_t0}$ represents information about an angle difference between the surrounding vehicle numbered i and the to-be-positioned vehicle at the initial moment $t_0$.

In an optional implementation, the first position reckoning result includes first position reckoning coordinates ($x_{i_t}$, $y_{i_t}$, $z_{i_t}$, $yaw_{i_t}$, $pitch_{i_t}$, $roll_{i_t}$), and the first position reckoning algorithm includes:

$yaw_{i\_t}=yaw_{i\_t-\Delta t}+yawrate_{i\_t}*\Delta t$;

$pitch_{i\_t}=pitch_{i\_t-\Delta t}$;

$roll_{i\_t}=roll_{i\_t-\Delta t}$;

$x_{i\_t}=x_{i\_t-\Delta t}+v_{i\_t}*\cos yaw_{i\_t}*\Delta t$;

$y_{i\_t}=y_{i\_t-\Delta t}+v_{i\_t}*\sin yaw_{i\_t}*\Delta t$; and $z_{i\_t}=z_{i\_t-\Delta t}$, where $x_{i_t}$, $y_{i_t}$, $z_{i_t}$, $yaw_{i_t}$, $pitch_{i_t}$, and $roll_{i_t}$ respectively represent coordinate information in the preset x-coordinate axis direction, coordinate information in the preset y-coordinate axis direction, coordinate information in the preset z-coordinate axis direction, yaw angle information, pitch angle information, and roll angle information that are of the surrounding vehicle numbered i and that are at a moment t, $x_{i_t-\Delta t}$, $y_{i_t-\Delta t}$, $z_{i_t-\Delta t}$, $yaw_{i_t-\Delta t}$, $pitch_{i_t-\Delta t}$, and $roll_{i_t-\Delta t}$ respectively represent coordinate information in the preset x-coordinate axis direction, coordinate information in the preset y-coordinate axis direction, coordinate information in the preset z-coordinate axis direction, yaw angle information, pitch angle information, and roll angle information that are of the surrounding vehicle numbered i and that are at the moment t−Δt, $yawrate_{i_t}$ represents yaw angular velocity information that is of the surrounding vehicle numbered i and that is at the moment t, Δt is a preset time interval, and $v_{i_t}$ represents vehicle speed information that is of the surrounding vehicle numbered i and that is at the moment t.

According to the foregoing method, the vehicle information of the surrounding vehicle is obtained, and the first position reckoning result of the surrounding vehicle is obtained through reckoning, so that the positioning information of the surrounding vehicle can be obtained through calculation in an environment in which a GPS fails, and the positioning information is used as basic information for calculating a positioning result of the to-be-positioned vehicle, thereby improving robustness of the positioning system.

In an optional implementation, the determining a second position reckoning result of the to-be-positioned vehicle based on the first position reckoning result includes: obtaining the information about the angle difference between the surrounding vehicle and the to-be-positioned vehicle, the information about the horizontal distance between the surrounding vehicle and the to-be-positioned vehicle, and the information about the vertical distance between the surrounding vehicle and the to-be-positioned vehicle; and obtaining the second position reckoning result with reference to the first position reckoning result by using a second position reckoning algorithm.

In an optional implementation, the second position reckoning result includes second position reckoning coordinates ($x_t$, $y_t$, $z_t$, $yaw_t$, $pitch_t$, $roll_t$), and the second position reckoning algorithm includes:

$x_t=x_{i\_t}-lx_{i\_t}$;

$y_t=y_{i\_t}-ly_{i\_t}$;

$z_t=z_{i\_t}$;

$yaw_t=yaw_{i\_t}-lyaw_{i\_t}$;

$pitch_t=pitch_{i\_t}$; and $roll_t=roll_{i\_t}$, where $x_t$, $y_t$, $z_t$, $yaw_t$, $pitch_t$, and $roll_t$ respectively represent coordinate information in the preset x-coordinate axis direction, coordinate information in the preset y-coordinate axis direction, coordinate information in the preset z-coordinate axis direction, yaw angle information, pitch angle information, and roll angle information that are of the to-be-positioned vehicle at the moment t, $x_{i_t}$, $y_{i_t}$, $z_{i_t}$, $yaw_{i_t}$, $pitch_{i_t}$, and $roll_{i_t}$ respectively represent the coordinate information in the preset x-coordinate axis direction, the coordinate information in the preset y-coordinate axis direction, the coordinate information in the preset z-coordinate axis direction, the yaw angle information, the pitch angle information, and the roll angle information that are of the surrounding vehicle numbered i and that are at the moment t, $x_{i_t}$ and $ly_{i_t}$ respectively represent information about a horizontal distance and information about a vertical distance between the surrounding vehicle numbered i and the to-be-positioned vehicle at the moment t, and $lyaw_{i_t}$ represents information about an angle difference between the surrounding vehicle numbered i and the to-be-positioned vehicle at the moment t.

According to the foregoing method, the information about the angle difference between the surrounding vehicle and the to-be-positioned vehicle and the information about the distance between the surrounding vehicle and the to-be-positioned vehicle are obtained, and the position reckoning result of the to-be-positioned vehicle is obtained through calculation by using the second position reckoning algorithm. In this way, the positioning information of the to-be-positioned vehicle can be calculated based on the vehicle information of the surrounding vehicle in a vehicle running process, thereby reducing a positioning error of the to-be-positioned vehicle, and implementing global positioning of the to-be-positioned vehicle.

In an optional implementation, before the determining a first position reckoning result of the surrounding vehicle based on the initial position information of the to-be-positioned vehicle and the vehicle information of the surrounding vehicle, the method further includes: determining whether the GPS position covariance is greater than the preset position covariance threshold, and if the GPS position covariance is greater than the preset position covariance threshold, performing the determining a first position reckoning result of the surrounding vehicle based on the initial position information of the to-be-positioned vehicle and the vehicle information of the surrounding vehicle.

According to the foregoing method, a value relationship between the GPS position covariance and the preset position covariance threshold is determined, and when the GPS position covariance is greater than the preset position covariance threshold, the vehicle positioning method provided in this embodiment of this application is enabled. Therefore, when accuracy of a positioning result is reduced due to a GPS failure or a vehicle-mounted sensor fault, the positioning system can be constrained by using the vehicle information of the surrounding vehicle, thereby effectively preventing a harm caused by a GPS positioning loss, and improving accuracy of a positioning result of the to-be-positioned vehicle.

In an optional implementation, when a quantity N of surrounding vehicles is greater than 1, N vehicles of the surrounding vehicles correspond to N first position reckoning results, and the determining a second position reckoning result of the to-be-positioned vehicle based on the first position reckoning result includes: respectively determining, based on the N first position reckoning results, N second position reckoning results corresponding to the to-be-positioned vehicle, calculating a positioning result average value of the N second position reckoning results, and using the positioning result average value as a final second position reckoning result of the to-be-positioned vehicle.

According to the foregoing method, when the quantity of surrounding vehicles is greater than 1, a second position reckoning result of the to-be-positioned vehicle relative to each surrounding vehicle is calculated. The positioning result of the to-be-positioned vehicle is further processed by using a method of obtaining an average value of the second position reckoning results, to reduce an error of the positioning result of the to-be-positioned vehicle, and implement global positioning of the to-be-positioned vehicle.

In an optional implementation, the method further includes: obtaining a GPS positioning result and an inertial measurement unit IMU reckoning result; and determining a final positioning result of the to-be-positioned vehicle based on the GPS positioning result and the IMU reckoning result and with reference to the second position reckoning result by using an extended Kalman filter (EKF).

According to the foregoing method, the EKF performs positioning result fusion on the GPS positioning result, the IMU reckoning result, and the second position reckoning result, so that when an IMU loses a positioning constraint, positioning constraint can be performed on the IMU by using the vehicle information of the surrounding vehicle, thereby improving accuracy of a positioning result and robustness of the positioning system.

According to a second aspect, an embodiment of this application provides a vehicle positioning apparatus, including:

a position covariance obtaining module, configured to obtain a global positioning system GPS position covariance of a to-be-positioned vehicle; a vehicle information obtaining module, configured to: when the GPS position covariance is less than or equal to a preset position covariance threshold, obtain initial position information of the to-be-positioned vehicle and vehicle information of a surrounding vehicle, where the surrounding vehicle is a vehicle whose distance from the to-be-positioned vehicle is less than a preset distance threshold, and the vehicle information includes distance information and vehicle speed information; a first position reckoning module, configured to determine a first position reckoning result of the surrounding vehicle based on the initial position information of the to-be-positioned vehicle and the vehicle information of the surrounding vehicle; and a second position reckoning module, configured to determine a second position reckoning result of the to-be-positioned vehicle based on the first position reckoning result.

It should be understood that the to-be-positioned vehicle may be a vehicle that needs to be positioned because a GPS fails in an environment such as a tunnel, a residential area, or an underground parking lot, or may be a vehicle whose vehicle-mounted sensor is faulty and that cannot be positioned by obtaining surrounding environment information. The faulty vehicle-mounted sensor may be a vehicle-mounted sensor such as a laser radar or an ultrasonic radar. A device for obtaining the vehicle information of the surrounding vehicle may be a device such as a vehicle-mounted camera, a millimeter-wave radar, and a V2X communications module. A device for determining a position reckoning result may be a vehicle-mounted terminal, or may be a device such as a server or a cloud.

In the foregoing apparatus, when the GPS fails or the vehicle-mounted sensor is faulty and vehicle positioning cannot be performed, the positioning information of the to-be-positioned vehicle may be calculated by obtaining information about the surrounding vehicle, so that a possibility of a safety accident caused by a positioning loss of the vehicle can be effectively reduced, and accuracy of a vehicle positioning result can be improved.

In an optional implementation, the vehicle information of the surrounding vehicle further includes identification information of the surrounding vehicle, orientation information of the surrounding vehicle, and information about an angle difference between the surrounding vehicle and the to-be-positioned vehicle, and the orientation information includes yaw angle information of the surrounding vehicle, pitch angle information of the surrounding vehicle, and roll angle information of the surrounding vehicle; the distance information includes information about a horizontal distance between the surrounding vehicle and the to-be-positioned vehicle, and information about a vertical distance between the surrounding vehicle and the to-be-positioned vehicle; and the vehicle speed information includes the vehicle speed information of the surrounding vehicle and yaw angular velocity information of the surrounding vehicle.

In an optional implementation, the first position reckoning module includes: a vehicle tracking table establishment unit, configured to establish a vehicle tracking table based on the vehicle information of the surrounding vehicle; an initial position calculation unit, configured to obtain initial position information of the surrounding vehicle based on the vehicle tracking table and the initial position information of the to-be-positioned vehicle by using an initial position reckoning algorithm; and a first position reckoning unit, configured to obtain the first position reckoning result based on the initial position information of the surrounding vehicle and the vehicle information of the surrounding vehicle by using a first position reckoning algorithm.

In an optional implementation, the initial position information of the surrounding vehicle includes first initial position coordinates ($x_{i\_t0}$, $y_{i\_t0}$, $z_{i\_t0}$, $yaw_{i\_t0}$, $pitch_{i\_t0}$, $roll_{i\_t0}$), the initial position information of the to-be-positioned vehicle includes second initial position coordinates ($x_{t0}$, $y_{t0}$, $z_{t0}$, $yaw_{t0}$, $pitch_{t0}$, $roll_{t0}$), and the initial position reckoning algorithm includes:

$$x_{i\_t0}=x_{t0}+lx_{i\_t0};$$

$$y_{i\_t0}=y_{t0}+ly_{i\_t0};$$

$$z_{i\_t0}=z_{t0};$$

$$yaw_{i\_t0}=yaw_{t0}+lyaw_{i\_t0};$$

$$pitch_{i\_t0}=pitch_{t0}; \text{ and}$$

$$roll_{i\_t0}=roll_{t0}, \text{ where}$$

$x_{i\_t0}$, $y_{i\_t0}$, $z_{i\_t0}$, $yaw_{i\_t0}$, $pitch_{i\_t0}$, and $roll_{i\_t0}$ respectively represent coordinate information in a preset x-coordinate axis direction, coordinate information in a preset y-coordinate axis direction, coordinate information in a preset z-coordinate axis direction, yaw angle information, pitch angle information, and roll angle information that are of a surrounding vehicle numbered i and that are at an initial moment $t_0$, $x_{t0}$, $y_{t0}$, $z_{t0}$, $yaw_{t0}$, $pitch_{t0}$, and $roll_{t0}$ respectively represent coordinate information in the preset x-coordinate axis direction, coordinate information in the preset y-coordinate axis direction, coordinate information in the preset z-coordinate axis direction, yaw angle information, pitch angle information, and roll angle information that are of the to-be-positioned vehicle at the initial moment $t_0$, $x_{i\_t0}$ and $ly_{i\_t0}$ respectively represent information about a horizontal distance and information about a vertical distance between the surrounding vehicle numbered i and the to-be-positioned vehicle at the initial moment $t_0$, and $lyaw_{i\_t0}$ represents information about an angle difference between the surrounding vehicle numbered i and the to-be-positioned vehicle at the initial moment $t_0$.

In an optional implementation, the first position reckoning result includes first position reckoning coordinates ($x_{i_t}$, $y_{i_t}$, $z_{i_t}$, $yaw_{i_t}$, $pitch_{i_t}$, $roll_{i_t}$), and the first position reckoning algorithm includes:

$$yaw_{i\_t}=yaw_{i\_t-\Delta t}+yawrate_{i\_t}*\Delta t;$$

$$pitch_{i_t}=pitch_{i_t-\Delta t};$$

$$roll_{i_t}=roll_{i_t-\Delta t};$$

$$x_{i_t}=x_{i_t-\Delta t}+v_{i_t}*\cos yaw_{i_t}*\Delta t;$$

$$y_{i_t}=y_{i_t-\Delta t}+v_{i_t}*\sin yaw_{i_t}*\Delta t; \text{ and}$$

$$z_{i\_t}=z_{i\_t-\Delta t}, \text{ where}$$

$x_{i_t}$, $y_{i_t}$, $z_{i_t}$, $yaw_{i_t}$, $pitch_{i_t}$, and $roll_{i_t}$ respectively represent coordinate information in the preset x-coordinate axis direction, coordinate information in the preset y-coordinate axis direction, coordinate information in the preset z-coordinate axis direction, yaw angle information, pitch angle information, and roll angle information that are of the surrounding vehicle numbered i and that are at a moment t, $x_{i_t-\Delta t}$, $y_{i_t-\Delta t}$, $z_{i_t-\Delta t}$, $yaw_{i_t-\Delta t}$, $pitch_{i_t-\Delta t}$, and $roll_{i_t-\Delta t}$ respectively represent coordinate information in the preset x-coordinate axis direction, coordinate information in the preset y-coordinate axis direction, coordinate information in the preset z-coordinate axis direction, yaw angle information, pitch angle information, and roll angle information that are of the surrounding vehicle numbered i and that are at the moment t−Δt, $yawrate_{i_t}$ represents yaw angular velocity information that is of the surrounding vehicle numbered i and that is at the moment t, Δt is a preset time interval, and $v_{i_t}$ represents vehicle speed information that is of the surrounding vehicle numbered i and that is at the moment t.

According to the foregoing apparatus, the vehicle information of the surrounding vehicle is obtained, and the first position reckoning result of the surrounding vehicle is obtained through reckoning, so that the positioning information of the surrounding vehicle can be obtained through calculation in an environment in which a GPS fails, and the positioning information is used as basic information for calculating a positioning result of the to-be-positioned vehicle, thereby improving robustness of the positioning system.

In an optional implementation, the second position reckoning module includes: an information obtaining unit, configured to obtain the information about the angle difference between the surrounding vehicle and the to-be-positioned vehicle, the information about the horizontal distance between the surrounding vehicle and the to-be-positioned vehicle, and the information about the vertical distance between the surrounding vehicle and the to-be-positioned vehicle; and a second position reckoning unit, configured to obtain the second position reckoning result with reference to the first position reckoning result by using a second position reckoning algorithm.

In an optional implementation, the second position reckoning result includes second position reckoning coordinates ($x_t$, $y_t$, $z_t$, $yaw_t$, $pitch_t$, and $roll_t$), and the second position reckoning algorithm includes:

$$x_t=x_{i\_t}-lx_{i\_t};$$

$$y_t=y_{i_t}-ly_{i_t};$$

$$z_t=z_{i_t};$$

$$yaw_t=yaw_{i\_t}-lyaw_{i\_t};$$

$$pitch_t=pitch_{i\_t}; \text{ and}$$

$$roll_t=roll_{i\_t}, \text{ where}$$

$x_t$, $y_t$, $z_t$, $yaw_t$, $pitch_t$, and $roll_t$ respectively represent coordinate information in the preset x-coordinate axis direction, coordinate information in the preset y-coordinate axis direction, coordinate information in the preset z-coordinate axis direction, yaw angle information, pitch angle information, and roll angle information that are of the to-be-positioned vehicle at the moment t, $x_{i_t}$, $y_{i_t}$, $z_{i_t}$, $yaw_{i_t}$, $pitch_{i_t}$, and $roll_{i_t}$ respectively represent the coordinate information in the preset x-coordinate axis direction, the coordinate information in the preset y-coordinate axis direction, the coordinate information in the preset z-coordinate axis direction, the yaw angle information, the pitch angle information, and the roll angle information that are of the surrounding vehicle numbered i and that are at the moment t, $x_{i_t}$, and $ly_{i_t}$ respectively represent information about a horizontal distance and information about a vertical distance between the surrounding vehicle numbered i and the to-be-positioned vehicle at the moment t, and $lyaw_{i_t}$ represents information about an angle difference between the surrounding vehicle numbered i and the to-be-positioned vehicle at the moment t.

According to the foregoing apparatus, the information about the angle difference between the surrounding vehicle and the to-be-positioned vehicle and the information about the distance between the surrounding vehicle and the to-be-positioned vehicle are obtained, and the position reckoning result of the to-be-positioned vehicle is obtained through calculation by using the second position reckoning algorithm. In this way, the positioning information of the to-be-positioned vehicle can be calculated based on the vehicle information of the surrounding vehicle in a vehicle running process, thereby reducing a positioning error of the to-be-positioned vehicle, and implementing global positioning of the to-be-positioned vehicle.

In an optional implementation, the first position reckoning module further includes: a position covariance determining unit, configured to: determine whether the GPS position covariance is greater than the preset position covariance threshold, and if the GPS position covariance is greater than the preset position covariance threshold, perform the step of determining a first position reckoning result of the surrounding vehicle based on the initial position information of the to-be-positioned vehicle and the vehicle information of the surrounding vehicle.

According to the foregoing apparatus, a value relationship between the GPS position covariance and the preset position covariance threshold is determined, and when the GPS position covariance is greater than the preset position covariance threshold, the vehicle positioning method provided in this embodiment of this application is enabled. Therefore, when accuracy of a positioning result is reduced due to a GPS failure or a vehicle-mounted sensor fault, the positioning system can be constrained by using the vehicle information of the surrounding vehicle, thereby effectively preventing a harm caused by a GPS positioning loss, and improving accuracy of a positioning result of the to-be-positioned vehicle.

In an optional implementation, when a quantity N of surrounding vehicles is greater than 1, N vehicles of the surrounding vehicles correspond to N first position reckoning results, and the second position reckoning module includes: a positioning result average value calculation unit, configured to respectively determine, based on the N first position reckoning results, N second position reckoning results corresponding to the to-be-positioned vehicle, calculate a positioning result average value of the N second position reckoning results, and use the positioning result average value as a final second position reckoning result of the to-be-positioned vehicle.

According to the foregoing apparatus, when the quantity of surrounding vehicles is greater than 1, a second position reckoning result of the to-be-positioned vehicle relative to each surrounding vehicle is calculated. The positioning result of the to-be-positioned vehicle is further processed by using a method of obtaining an average value of the second position reckoning results, to reduce an error of the positioning result of the to-be-positioned vehicle, and implement global positioning of the to-be-positioned vehicle.

In an optional implementation, the apparatus further includes: a positioning result obtaining module, configured to obtain a GPS positioning result and an inertial measurement unit IMU reckoning result; and a positioning result fusion module, configured to determine a final positioning result of the to-be-positioned vehicle based on the GPS positioning result and the IMU reckoning result and with reference to the second position reckoning result by using an extended Kalman filter.

According to the foregoing apparatus, the EKF performs positioning result fusion on the GPS positioning result, the IMU reckoning result, and the second position reckoning result, so that when an IMU loses a positioning constraint, positioning constraint can be performed on the IMU by using the vehicle information of the surrounding vehicle, thereby improving accuracy of a positioning result and robustness of the positioning system.

According to a third aspect, an embodiment of this application provides a vehicle positioning apparatus, including a memory and a processor. The memory is configured to store a computer program, and the processor is configured to invoke the computer program to perform the method according to the first aspect or any one of the possible implementations of the first aspect.

According to a fourth aspect, an embodiment of this application provides a computer-readable storage medium. The computer-readable storage medium stores a computer program. The computer program includes program instructions. When the program instructions are executed by a processor, the method according to the first aspect or any one of the possible implementations of the first aspect is performed.

BRIEF DESCRIPTION OF DRAWINGS

To describe the technical solutions in embodiments of this application or in the background more clearly, the following briefly describes the accompanying drawings for describing embodiments of this application or the background.

DESCRIPTION OF EMBODIMENTS

Figure 1:
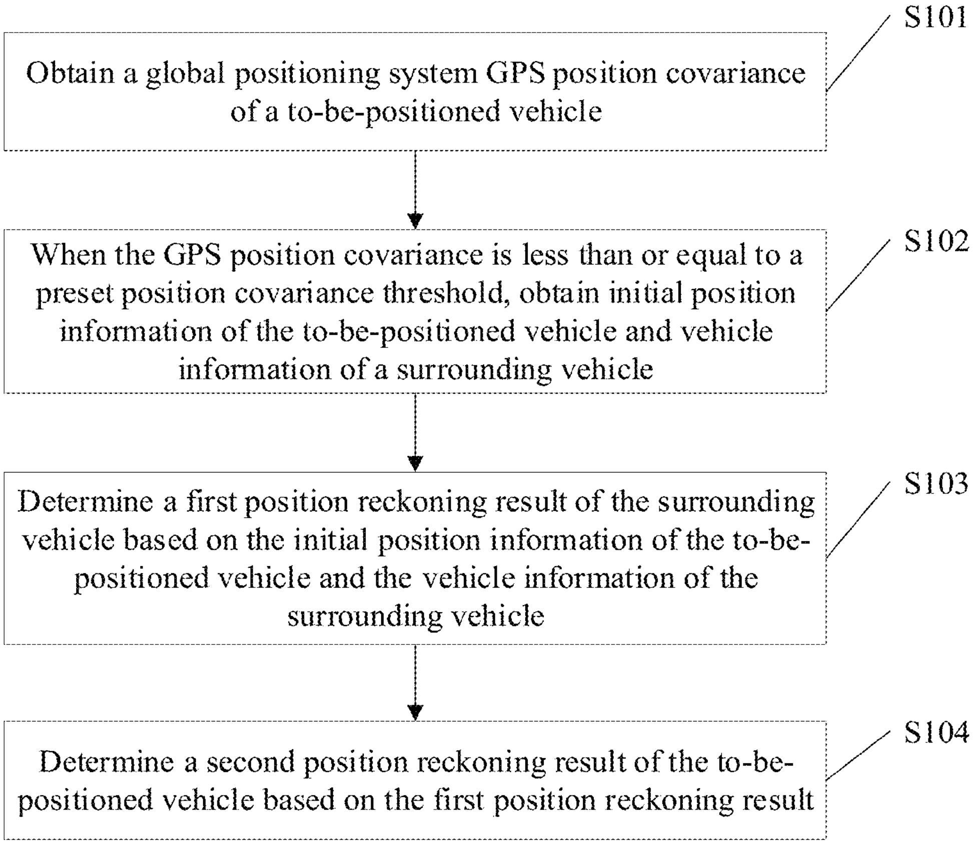
FIG. 1 is a schematic flowchart of a vehicle positioning method according to an embodiment of this application.

The following describes embodiments of this application with reference to the accompanying drawings in embodiments of this application.

A vehicle positioning method provided in the embodiments of this application may be applied to a scenario in which a GPS fails or a vehicle-mounted sensor is faulty, or certainly, may be applied to a scenario in which a GPS or a vehicle-mounted sensor is normal. The following separately uses a scenario 1 and a scenario 2 as examples to describe the vehicle positioning method provided in the embodiments of this application.

Scenario 1:

A vehicle positioning technology provides an important basis for implementing autonomous driving, and is a key technology in the field of autonomous driving technologies. In addition, in a general vehicle navigation system, travel route planning also needs to be implemented based on vehicle positioning. Currently, most vehicle positioning technologies are implemented based on a GPS. However, because a GPS signal is blocked and reflected by a surrounding environment, in a special scenario, for example, a tunnel, a residential area, or an underground parking, a GPS signal is weak, resulting in a problem of a poor vehicle positioning effect.

Scenario 2:

A vehicle positioning technology provides an important basis for implementing autonomous driving, and is a key technology in the field of autonomous driving technologies. In addition, in a general vehicle navigation system, travel route planning also needs to be implemented based on vehicle positioning. Because a GPS has problems such as relatively low update frequency and a tendency to be blocked and reflected, in a complex scenario, and it is difficult to accurately position a vehicle by using only the GPS, a plurality of types of road information may be obtained by using another vehicle-mounted sensor, to position a vehicle. However, in a traveling process of the vehicle, when a vehicle-mounted sensor encounters an unexpected fault, positioning constraint cannot be performed on a positioning result, and accuracy of the positioning result is affected. For example, when a laser radar sensor is faulty, a distance between the vehicle and a surrounding obstacle cannot be measured, and consequently, a positioning result of the vehicle is affected.

In the scenario 1 or the scenario 2, a to-be-positioned vehicle may obtain a global positioning system GPS position covariance of a to-be-positioned vehicle; when the GPS position covariance is less than or equal to a preset position covariance threshold, obtain initial position information of the to-be-positioned vehicle and vehicle information of a surrounding vehicle, where the surrounding vehicle is a vehicle whose distance from the to-be-positioned vehicle is less than a preset distance threshold, and the vehicle information includes distance information and vehicle speed information; determine a first position reckoning result of the surrounding vehicle based on the initial position information of the to-be-positioned vehicle and the vehicle information of the surrounding vehicle; and determine a second position reckoning result of the to-be-positioned vehicle based on the first position reckoning result. A GPS positioning result and an IMU reckoning result are obtained; and positioning fusion is performed by using an EKF based on the GPS positioning result and the IMU reckoning result and with reference to the second position reckoning result, to determine a final positioning result of the to-be-positioned vehicle.

It may be learned that, according to the vehicle positioning method provided in this embodiment of this application, the initial position information of the to-be-positioned vehicle may be obtained when the GPS is normal, and then, when the GPS fails or a signal is poor, and/or a sensor of the to-be-positioned vehicle is faulty, vehicle information of a surrounding vehicle is obtained, and global positioning information of the to-be-positioned vehicle is obtained through calculation with reference to the initial position information of the to-be-positioned vehicle, thereby effectively improving accuracy of a vehicle positioning result and robustness of a vehicle positioning system.

The following describes in detail the methods in embodiments of this application.

It should be noted that, Embodiment 1 and Embodiment 2 below may be applied to the scenario 1 and the scenario 2 above.

Embodiment 1

FIG. 1 is a schematic flowchart of a vehicle positioning method according to an embodiment of this application. As shown in FIG. 1, the vehicle positioning method includes the following steps.

S101: Obtain a global positioning system GPS position covariance of a to-be-positioned vehicle.

The to-be-positioned vehicle may be a vehicle that needs to be positioned because a GPS fails in an environment such as a tunnel, a residential area, or an underground parking lot, or may be a vehicle whose vehicle-mounted sensor is faulty and that cannot be positioned by obtaining surrounding environment information. The faulty vehicle-mounted sensor may be a vehicle-mounted sensor such as a laser radar or an ultrasonic radar.

It should be understood that the GPS position covariance may be used to indicate accuracy of a positioning result output by the vehicle positioning system. A smaller GPS position covariance indicates higher accuracy of the positioning result. Otherwise, a larger GPS position covariance indicates lower accuracy of the positioning result output by the vehicle positioning system.

S102: When the GPS position covariance is less than or equal to a preset position covariance threshold, obtain initial position information of the to-be-positioned vehicle and vehicle information of a surrounding vehicle.

It should be understood that a device for obtaining the initial position information of the to-be-positioned vehicle may be a device such as a vehicle-mounted GPS receiver and an inertial measurement unit IMU sensor. A device for obtaining the vehicle information of the surrounding vehicle may be a device such as a vehicle-mounted camera, a millimeter-wave radar, or a V2X broadcast communicator. The vehicle-mounted camera may be a monocular camera, a binocular camera, a trinocular camera, a 360-degree view camera, or the like. This is not limited in this embodiment of this application.

The surrounding vehicle is a vehicle whose distance from the to-be-positioned vehicle is less than a preset distance threshold, and the vehicle information includes distance information and vehicle speed information. The preset distance threshold may be used to indicate a maximum distance between the surrounding vehicle and the to-be-positioned vehicle. When the distance between the surrounding vehicle and the to-be-positioned vehicle is less than the preset distance threshold, the to-be-positioned vehicle may obtain the vehicle information of the surrounding vehicle by using a device such as a V2X broadcast communicator.

The vehicle information of the surrounding vehicle further includes identification information of the surrounding vehicle, orientation information of the surrounding vehicle, and information about an angle difference between the surrounding vehicle and the to-be-positioned vehicle, and the orientation information includes yaw angle information of the surrounding vehicle, pitch angle information of the surrounding vehicle, and roll angle information of the surrounding vehicle in a world coordinate system; the distance information includes information about a horizontal distance between the surrounding vehicle and the to-be-positioned vehicle, and information about a vertical distance between the surrounding vehicle and the to-be-positioned vehicle; and the vehicle speed information includes the vehicle speed information of the surrounding vehicle and yaw angular velocity information of the surrounding vehicle. It should be understood that the identification information of the surrounding vehicle may be information that uniquely identifies a vehicle, such as a license plate number. This is not limited in this embodiment of this application.

S103: Determine a first position reckoning result of the surrounding vehicle based on the initial position information of the to-be-positioned vehicle and the vehicle information of the surrounding vehicle.

A device for determining the first position reckoning result may be a vehicle-mounted terminal, or may be a device such as a server or a cloud. This is not limited in this embodiment of this application.

Before step S103, the method provided in this embodiment of this application may further include: determining whether the GPS position covariance is greater than the preset position covariance threshold, and if the GPS position covariance is greater than the preset position covariance threshold, performing the determining a first position reckoning result of the surrounding vehicle based on the initial position information of the to-be-positioned vehicle and the vehicle information of the surrounding vehicle.

It should be understood that, when the GPS position covariance is greater than the preset position covariance threshold, it indicates that the positioning result output by the vehicle positioning system is inconsistent with an actual vehicle position in this case, and step S103 starts to be performed.

Figure 2:
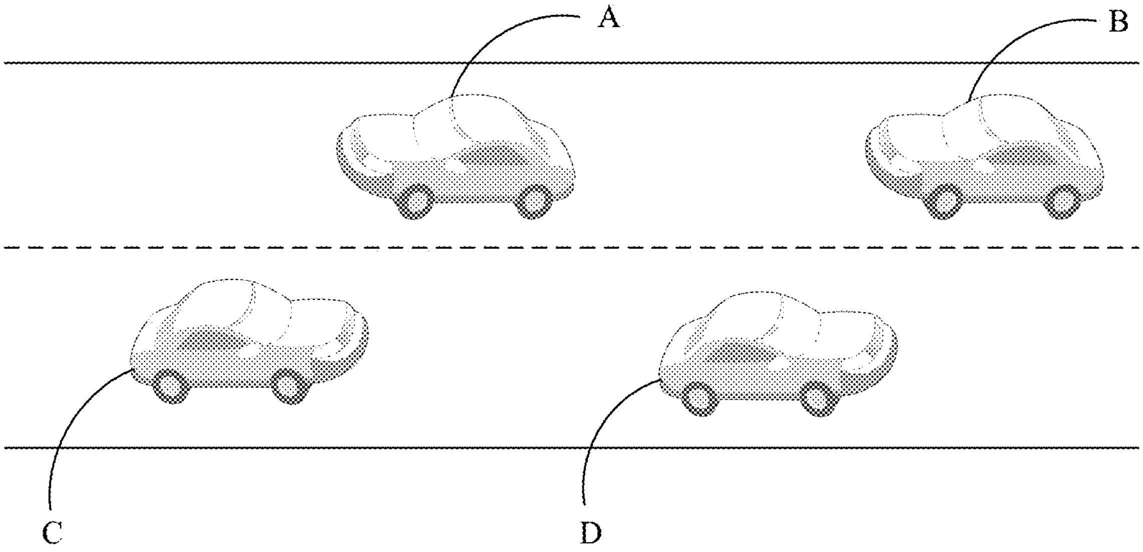
FIG. 2 is a schematic diagram of a scenario of a vehicle positioning method according to an embodiment of this application.

FIG. 2 is a schematic diagram of a scenario of a vehicle positioning method according to an embodiment of this application. As shown in FIG. 2, four vehicles travel on a lane in total. The four vehicles all have unique identification information, which are A, B, C, and D respectively. A vehicle A is a to-be-positioned vehicle, and a distance between the vehicle A and each of the vehicle B, the vehicle C, and the vehicle D is less than the preset distance threshold. In addition, a V2X broadcast communicator is disposed on each of the four vehicles, and a vehicle-mounted camera, a millimeter-wave radar sensor, a vehicle-mounted GPS receiver, and an inertial measurement unit IMU are further disposed on the vehicle A. In the scenario 1, due to blocking by a building or the like, GPS positioning of A, B, C, and D is temporarily lost. In this case, before the GPS positioning is lost, the vehicle A obtains initial position information of the vehicle A and vehicle information of the surrounding vehicles B, C, and D in step S102. When it is detected that a GPS position covariance is greater than the preset position covariance threshold, in other words, after the GPS positioning is lost, step S103 is performed. In the scenario 2, because a sensor of the vehicle A is faulty, positioning of the vehicle A is affected. In this case, the vehicle A may obtain initial position information of the vehicle A and vehicle information of the surrounding vehicles B, C, and D in step S102. When it is detected that a GPS position covariance is greater than the preset position covariance threshold, in other words, the vehicle-mounted sensor is faulty, after positioning is affected, step S103 starts to be performed.

Figure 3:
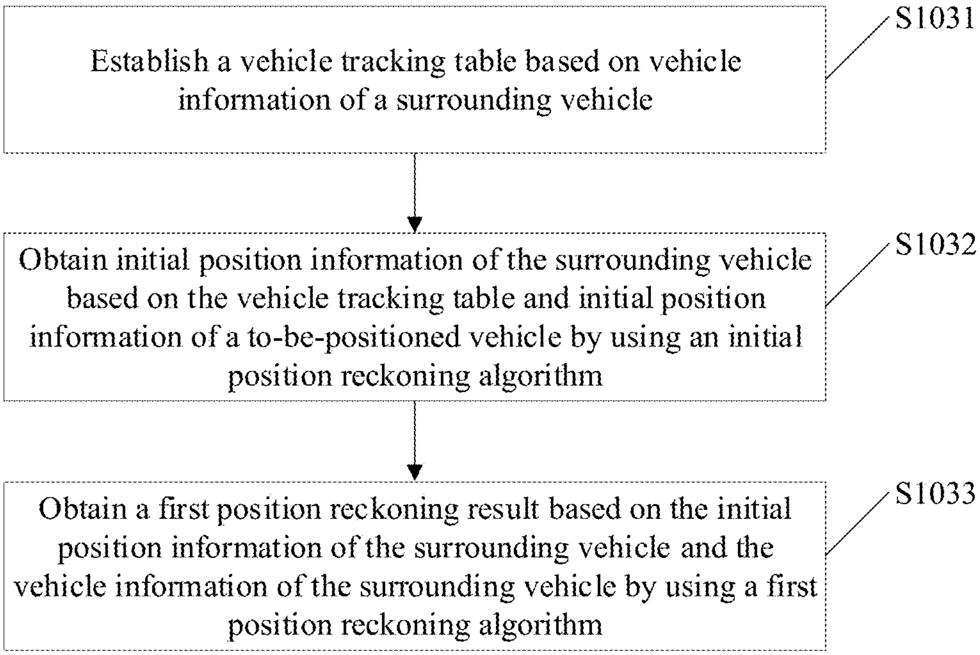
FIG. 3 is a schematic flowchart of determining a first position reckoning result according to an embodiment of this application.

Specifically, FIG. 3 is a schematic flowchart of determining a first position reckoning result according to an embodiment of this application. As shown in FIG. 3, step S103 includes the following steps.

S1031: Establish a vehicle tracking table based on the vehicle information of the surrounding vehicle.

The vehicle tracking table may include the identification information of the surrounding vehicle, an obtaining time of the vehicle information, the initial position information, the vehicle speed information, the orientation information, information about a distance between the surrounding vehicle and the to-be-positioned vehicle, and the first position reckoning result.

It should be understood that the identification information of the surrounding vehicle may be obtained by using the vehicle-mounted camera of the to-be-positioned vehicle, and the vehicle speed information and the orientation information of the surrounding vehicle may b e obtained by using the V2X broadcast communicator of the to-be-positioned vehicle. The information about the distance between the surrounding vehicle and the to-be-positioned vehicle specifically includes information about a horizontal distance and information about a vertical distance, and may be obtained by using the millimeter-wave radar, the V2X broadcast communicator, and the vehicle-mounted camera of the to-be-positioned vehicle. Image data captured by the vehicle-mounted camera may be used to determine a position relationship between the surrounding vehicle and the to-be-positioned vehicle, for example, front, rear, left, or right. Initial position information of the surrounding vehicle and the first position reckoning result may be calculated by using a device such as a vehicle-mounted terminal, a server, or a cloud of the to-be-positioned vehicle. This is not limited in this embodiment of this application.

S1032: Obtain the initial position information of the surrounding vehicle based on the vehicle tracking table and the initial position information of the to-be-positioned vehicle by using an initial position reckoning algorithm.

In an optional implementation, the initial position information of the surrounding vehicle may be first initial position coordinates ($x_{i\_t0}$, $y_{i\_t0}$, $z_{i\_t0}$, $yaw_{i\_t0}$, $pitch_{i\_t0}$, $roll_{i\_t0}$), the initial position information of the to-be-positioned vehicle may be second initial position coordinates ($x_{t0}$, $y_{t0}$, $z_{t0}$, $yaw_{t0}$, $pitch_{t0}$, $roll_{t0}$), and the initial position reckoning algorithm is:

$$x_{i\_t0}=x_{t0}+lx_{i\_t0};$$

$$y_{i\_t0}=y_{t0}+ly_{i\_t0};$$

$$z_{i\_t0}=z_{t0};$$

$$\mathrm{yaw}_{i\_t0}=yaw_{t0}+l\mathrm{yaw}_{i\_t0};$$

$$\mathrm{pitch}_{i\_t0}=\mathrm{pitch}_{t0}; \text{ and}$$

$$\mathrm{roll}_{i\_t0}=\mathrm{roll}_{t0}, \text{ where}$$

$x_{i\_t0}$, $y_{i\_t0}$, $z_{i\_t0}$, $yaw_{i\_t0}$, $pitch_{i\_t0}$, and $roll_{i\_t0}$ respectively represent coordinate information in a preset x-coordinate axis direction, coordinate information in a preset y-coordinate axis direction, coordinate information in a preset z-coordinate axis direction, yaw angle information, pitch angle information, and roll angle information that are of a surrounding vehicle numbered i and that are at an initial moment $t_0$, $x_{t0}$, $y_{t0}$, $z_{t0}$, $yaw_{t0}$, $pitch_{t0}$, and $roll_{t0}$ respectively represent coordinate information in the preset x-coordinate axis direction, coordinate information in the preset y-coordinate axis direction, coordinate information in the preset z-coordinate axis direction, yaw angle information, pitch angle information, and roll angle information that are of the to-be-positioned vehicle at the initial moment $t_0$, $x_{i\_t0}$ and $ly_{i\_t0}$ respectively represent information about a horizontal distance and information about a vertical distance between the surrounding vehicle numbered i and the to-be-positioned vehicle at the initial moment $t_0$, and $lyaw_{i\_t0}$ represents information about an angle difference between the surrounding vehicle numbered i and the to-be-positioned vehicle at the initial moment $t_0$.

Specifically, x, y, and z may be three-dimensional rectangular coordinates in the world coordinate system. A geodetic rectangular coordinate system in which the rectangular coordinates are located may use a specific position as a fixed origin, for example, a position in which the to-be-positioned vehicle starts to perform step S103; and uses a due north direction as an x-coordinate axis direction, uses a due east direction as a y-coordinate axis direction, and uses a vertical upward direction as a z-coordinate axis direction. Alternatively, x, y, and z may represent a latitude, a longitude, and an altitude of a position of the vehicle. yaw is an angle at which a vehicle head of the vehicle rotates around a z-coordinate axis, pitch is used to represent an included angle between the vehicle head of the vehicle and a geodetic horizontal plane, namely, an angle at which the vehicle rotates around a y-coordinate axis, and roll is an angle at which the vehicle rotates around an x-coordinate axis.

S1033: Obtain the first position reckoning result based on the initial position information of the surrounding vehicle and the vehicle information of the surrounding vehicle by using a first position reckoning algorithm.

In an optional implementation, the first position reckoning result includes first position reckoning coordinates ($x_{i_t}$, $y_{i_t}$, $z_{i_t}$, $yaw_{i_t}$, $pitch_{i_t}$, $roll_{i_t}$), and the first position reckoning algorithm includes:

$$yaw_{i\_t} = yaw_{i\_t-\Delta t} + yawrate_{i\_t} * \Delta t;$$

$$pitch_{i\_t} = pitch_{i\_t-\Delta t};$$

$$roll_{i\_t} = roll_{i\_t-\Delta t};$$

$$x_{i\_t} = x_{i\_t-\Delta t} + v_{i\_t} * \cos yaw_{i\_t} * \Delta t;$$

$$y_{i\_t} = y_{i\_t-\Delta t} + v_{i\_t} * \sin yaw_{i\_t} * \Delta t; \text{ and}$$

$$z_{i\_t} = z_{i\_t-\Delta t}, \text{ where}$$

$x_{i_t}$, $y_{i_t}$, $z_{i_t}$, $yaw_{i_t}$, $pitch_{i_t}$, and $roll_{i_t}$ respectively represent coordinate information in the preset x-coordinate axis direction, coordinate information in the preset y-coordinate axis direction, coordinate information in the preset z-coordinate axis direction, yaw angle information, pitch angle information, and roll angle information that are of the surrounding vehicle numbered i and that are at a moment t, $x_{i_t-\Delta t}$, $y_{i_t-\Delta t}$, $z_{i_t-\Delta t}$, $yaw_{i_t-\Delta t}$, $pitch_{i_t-\Delta t}$, and $roll_{i_t-\Delta t}$ respectively represent coordinate information in the preset x-coordinate axis direction, coordinate information in the preset y-coordinate axis direction, coordinate information in the preset z-coordinate axis direction, yaw angle information, pitch angle information, and roll angle information that are of the surrounding vehicle numbered i and that are at the moment t−Δt, $yawrate_{i_t}$ represents yaw angular velocity information that is of the surrounding vehicle numbered i and that is at the moment t, Δt is a preset time interval, and $v_{i_t}$ represents vehicle speed information that is of the surrounding vehicle numbered i and that is at the moment t.

It should be understood that the yaw angular velocity information and the vehicle speed information of the surrounding vehicle may be obtained by using the V2X broadcast communicator.

In steps S1031 to S1033, on the basis of obtaining the initial position information of the to-be-positioned vehicle, the first position reckoning result of the surrounding vehicle may be obtained through calculation by using the vehicle information of the surrounding vehicle and with reference to the initial position reckoning algorithm and the first position reckoning algorithm, and the first position reckoning result is used as basic information for calculating a positioning result of the to-be-positioned vehicle, so as to resolve a problem that vehicle positioning cannot be performed when a GPS of the surrounding vehicle is lost, thereby improving robustness of the positioning system.

S104: Determine a second position reckoning result of the to-be-positioned vehicle based on the first position reckoning result.

Figure 4:
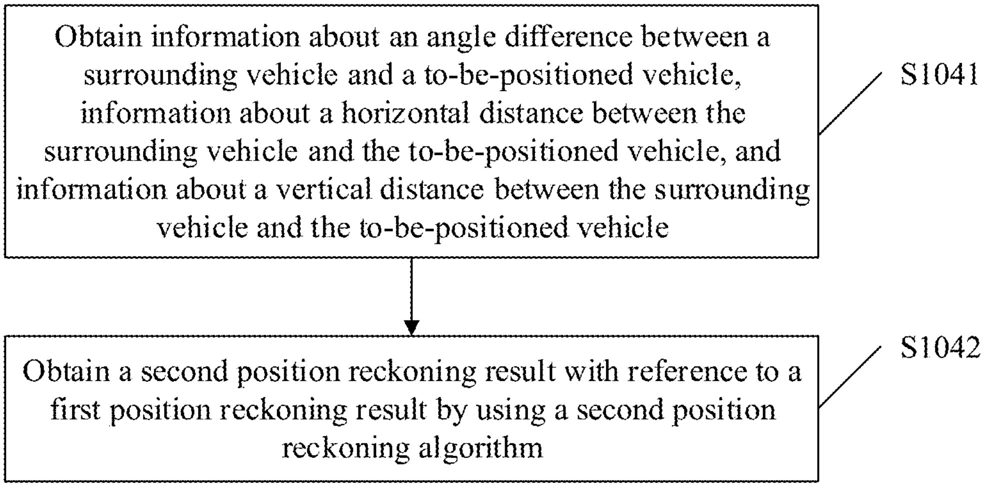
FIG. 4 is a schematic flowchart of determining a second position reckoning result according to an embodiment of this application.

Specifically, FIG. 4 is a schematic flowchart of determining a second position reckoning result according to an embodiment of this application. As shown in FIG. 4, step S104 includes the following steps.

S1041: Obtain the information about the angle difference between the surrounding vehicle and the to-be-positioned vehicle, the information about the horizontal distance between the surrounding vehicle and the to-be-positioned vehicle, and the information about the vertical distance between the surrounding vehicle and the to-be-positioned vehicle.

It should be understood that the information about the angle difference between the surrounding vehicle and the to-be-positioned vehicle may be obtained by using the millimeter-wave radar of the to-be-positioned vehicle. The information about the horizontal distance between the surrounding vehicle and the to-be-positioned vehicle, and the information about the vertical distance between the surrounding vehicle and the to-be-positioned vehicle may be obtained by using the millimeter-wave radar and the vehicle-mounted camera of the to-be-positioned vehicle. The millimeter-wave radar is configured to measure a distance between the surrounding vehicle and the to-be-positioned vehicle, and the vehicle-mounted camera is configured to capture a position relationship between the surrounding vehicle and the to-be-positioned vehicle.

S1042: Obtain the second position reckoning result with reference to the first position reckoning result by using a second position reckoning algorithm.

In an optional implementation, the second position reckoning result includes second position reckoning coordinates ($x_t$, $y_t$, $z_t$, $yaw_t$, $pitch_t$, $roll_t$), and the second position reckoning algorithm includes:

$$x_t = x_{i_t} - lx_{i_t};$$

$$y_t = y_{i_t} - ly_{i_t};$$

$$z_t = z_{i_t};$$

$yaw_t = yaw_{i\_t} - lyaw_{i\_t}$;

$pitch_t = pitch_{i\_t}$; and $roll_t = roll_{i\_t}$, where $x_t$, $y_t$, $z_t$, $yaw_t$, $pitch_t$, and $roll_t$ respectively represent coordinate information in the preset x-coordinate axis direction, coordinate information in the preset y-coordinate axis direction, coordinate information in the preset z-coordinate axis direction, yaw angle information, pitch angle information, and roll angle information that are of the to-be-positioned vehicle at the moment t, $x_{i_t}$, $y_{i_t}$, $z_{i_t}$, $yaw_{i_t}$, $pitch_{i_t}$, and $roll_{i_t}$ respectively represent the coordinate information in the preset x-coordinate axis direction, the coordinate information in the preset y-coordinate axis direction, the coordinate information in the preset z-coordinate axis direction, the yaw angle information, the pitch angle information, and the roll angle information that are of the surrounding vehicle numbered i and that are at the moment t, $x_{i_t}$ and $ly_{i_t}$ respectively represent information about a horizontal distance and information about a vertical distance between the surrounding vehicle numbered i and the to-be-positioned vehicle at the moment t, and $lyaw_{i_t}$ represents information about an angle difference between the surrounding vehicle numbered i and the to-be-positioned vehicle at the moment t.

It should be understood that, in an optional implementation, when the vehicle is in an uphill or downhill road section, an updated value of z and the pitch angle information of the vehicle may be obtained through a high-precision map. This is not limited in this embodiment of this application.

It should be understood that, in step S103, the first position reckoning result of the surrounding vehicle is determined by using the first position reckoning algorithm. Based on the first position reckoning result, with reference to the distance and the position relationship between the surrounding vehicle and the to-be-positioned vehicle, and the information about the angle difference between the surrounding vehicle and the to-be-positioned vehicle, the position of the to-be-positioned vehicle, namely, the second position reckoning result, may be deduced by using the second position reckoning algorithm. The position relationship between the surrounding vehicle and the to-be-positioned vehicle may determine positive and negative values of $lx_{i_t}$ and $ly_{i_t}$. For example, in the x-coordinate axis direction, when the surrounding vehicle is in a positive direction of the to-be-positioned vehicle, $lx_{i_t}$ is a positive number; otherwise, when the surrounding vehicle is in a negative direction of the to-be-positioned vehicle, $x_{i_t}$ is a negative number; and in the y-coordinate axis direction, when the surrounding vehicle is in a positive direction of the to-be-positioned vehicle, $ly_{i_t}$ is a positive number; otherwise, when the surrounding vehicle is in a negative direction of the to-be-positioned vehicle, $ly_{i_t}$ is a negative number.

Further, when a quantity N of surrounding vehicles is greater than 1, N vehicles of the surrounding vehicles correspond to N first position reckoning results. After step S1042, the method includes: respectively determining, based on the N first position reckoning results, N second position reckoning results corresponding to the to-be-positioned vehicle, calculating a positioning result average value of the N second position reckoning results, and using the positioning result average value as a final second position reckoning result of the to-be-positioned vehicle.

Embodiment 2

Figure 5:
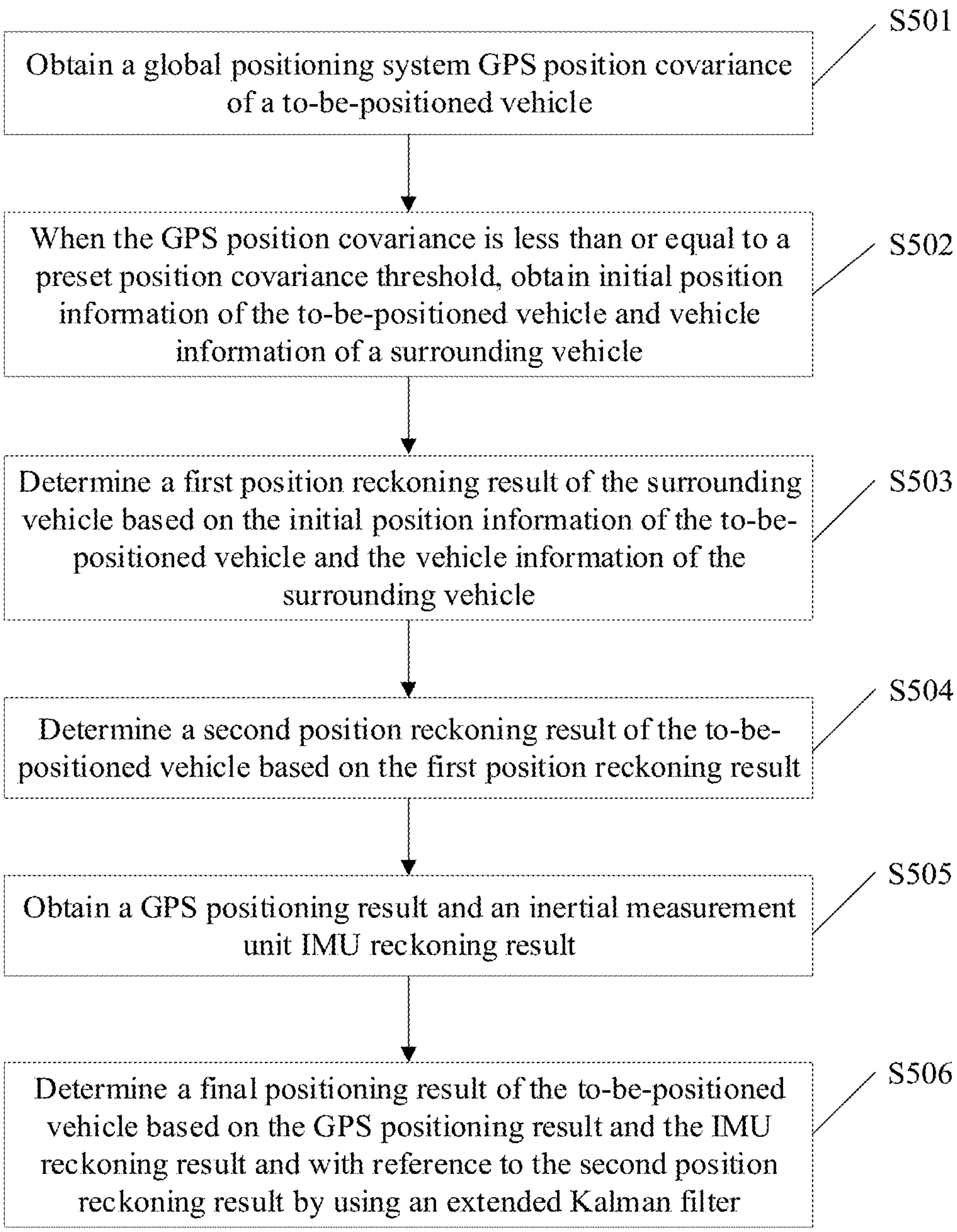
FIG. 5 is a schematic flowchart of another vehicle positioning method according to an embodiment of this application.

FIG. 5 is a schematic flowchart of another vehicle positioning method according to an embodiment of this application. As shown in FIG. 5, compared with Embodiment 1, steps S501 to S504 are the same as steps S101 to S104 in Embodiment 1. After step S504, the method in Embodiment 2 further includes the following steps:

S505: Obtain a GPS positioning result and an inertial measurement unit IMU reckoning result.

S506: Determine a final positioning result of the to-be-positioned vehicle based on the GPS positioning result and the IMU reckoning result and with reference to the second position reckoning result by using an extended Kalman filter.

It should be understood that the second position reckoning result obtained through calculation according to the method in Embodiment 1 may be used as a positioning result of the to-be-positioned vehicle, or may be used as a positioning constraint of an IMU. The GPS positioning result, the IMU reckoning result, and the second position reckoning result are fused by using the extended Kalman filter EKF, to obtain the final positioning result of the to-be-positioned vehicle.

In an optional implementation, after vehicle positioning information is initialized, the EKF starts to perform iteration of positioning information prediction and positioning information observation, and finally obtains the final positioning result of the to-be-positioned vehicle. The positioning information observation may be used to perform weighted correction on a result of the positioning information prediction, to achieve accuracy of the positioning result.

The following describes apparatuses in embodiments of this application with reference to accompanying drawings.

Figure 6:
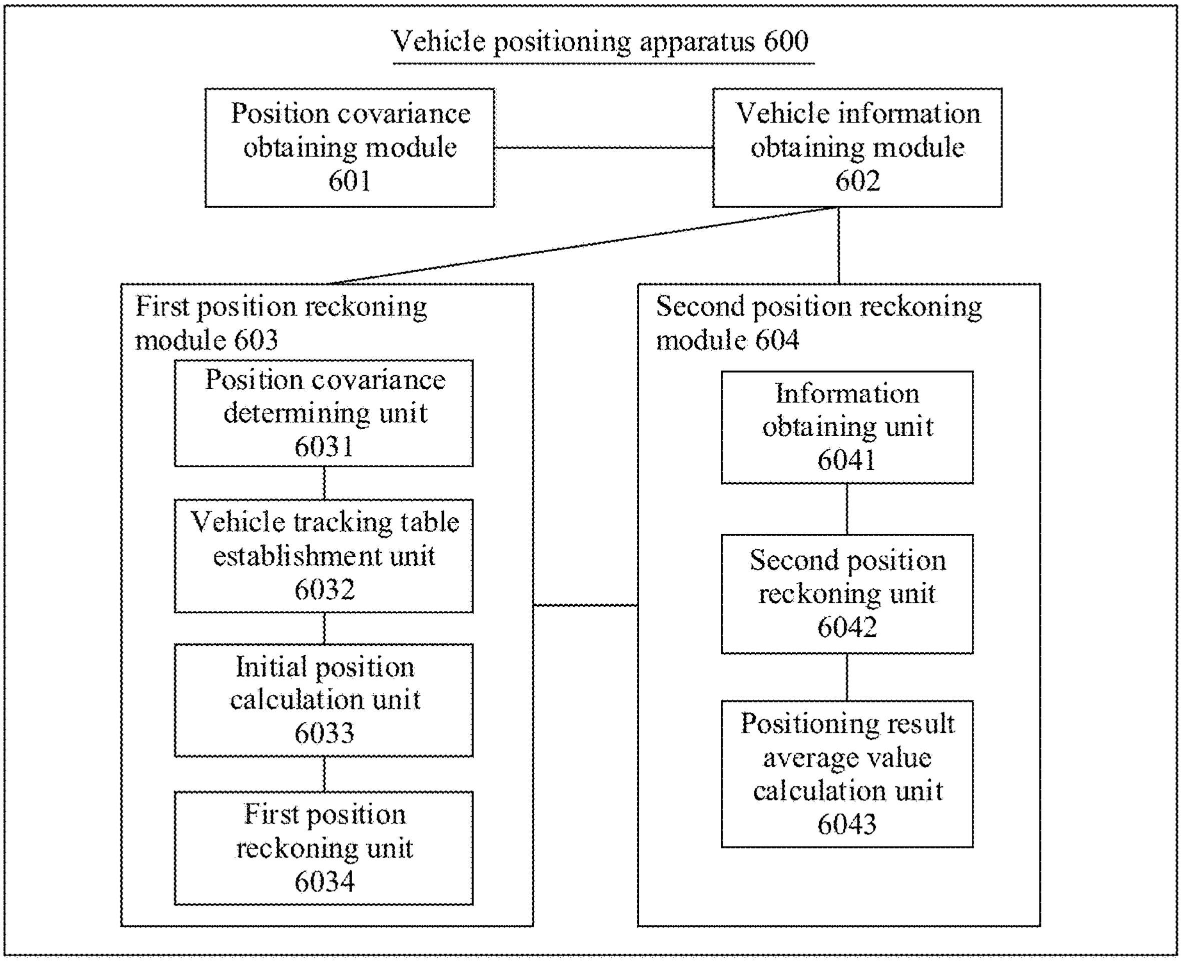
FIG. 6 is a schematic diagram of composition of a vehicle positioning apparatus according to an embodiment of this application.

FIG. 6 is a schematic diagram of composition of a vehicle positioning apparatus according to an embodiment of this application. As shown in FIG. 6, a vehicle positioning apparatus 600 provided in this embodiment of this application may include:

- a position covariance obtaining module 601, configured to obtain a global positioning system GPS position covariance of a to-be-positioned vehicle;
- a vehicle information obtaining module 602, configured to: when the GPS position covariance is less than or equal to a preset position covariance threshold, obtain initial position information of the to-be-positioned vehicle and vehicle information of a surrounding vehicle, where the surrounding vehicle is a vehicle whose distance from the to-be-positioned vehicle is less than a preset distance threshold, and the vehicle information includes distance information and vehicle speed information;
- a first position reckoning module 603, configured to determine a first position reckoning result of the surrounding vehicle based on the initial position information of the to-be-positioned vehicle and the vehicle information of the surrounding vehicle; and
- a second position reckoning module 604, configured to determine a second position reckoning result of the to-be-positioned vehicle based on the first position reckoning result.

For a specific function implementation of the position covariance obtaining module 601 and the vehicle information obtaining module 602, refer to steps S101 and S102 in Embodiment 1 corresponding to FIG. 1. Details are not described herein again.

Further, the first position reckoning module 603 includes:

a position covariance determining unit 6031, configured to: determine whether the GPS position covariance is greater than the preset position covariance threshold, and if the GPS position covariance is greater than the preset position covariance threshold, perform step S103 in Embodiment 1;

a vehicle tracking table establishment unit 6032, configured to establish a vehicle tracking table based on the vehicle information of the surrounding vehicle;

an initial position calculation unit 6033, configured to obtain initial position information of the surrounding vehicle based on the vehicle tracking table and the initial position information of the to-be-positioned vehicle by using an initial position reckoning algorithm; and a first position reckoning unit 6034, configured to obtain the first position reckoning result based on the initial position information of the surrounding vehicle and the vehicle information of the surrounding vehicle by using a first position reckoning algorithm.

For a specific function implementation of the first position reckoning module 603, refer to step S103 in Embodiment 1 corresponding to FIG. 1. Details are not described herein again.

Further, the second position reckoning module 604 includes:

an information obtaining unit 6041, configured to obtain the information about the angle difference between the surrounding vehicle and the to-be-positioned vehicle, the information about the horizontal distance between the surrounding vehicle and the to-be-positioned vehicle, and the information about the vertical distance between the surrounding vehicle and the to-be-positioned vehicle;

a second position reckoning unit 6042, configured to obtain the second position reckoning result with reference to the first position reckoning result by using a second position reckoning algorithm; and a positioning result average value calculation unit 6043, configured to respectively determine, based on the N first position reckoning results, N second position reckoning results corresponding to the to-be-positioned vehicle, calculate a positioning result average value of the N second position reckoning results, and use the positioning result average value as a final second position reckoning result of the to-be-positioned vehicle.

For a specific function implementation of the second position reckoning module 604, refer to step S104 in Embodiment 1 corresponding to FIG. 1. Details are not described herein again.

Figure 7:
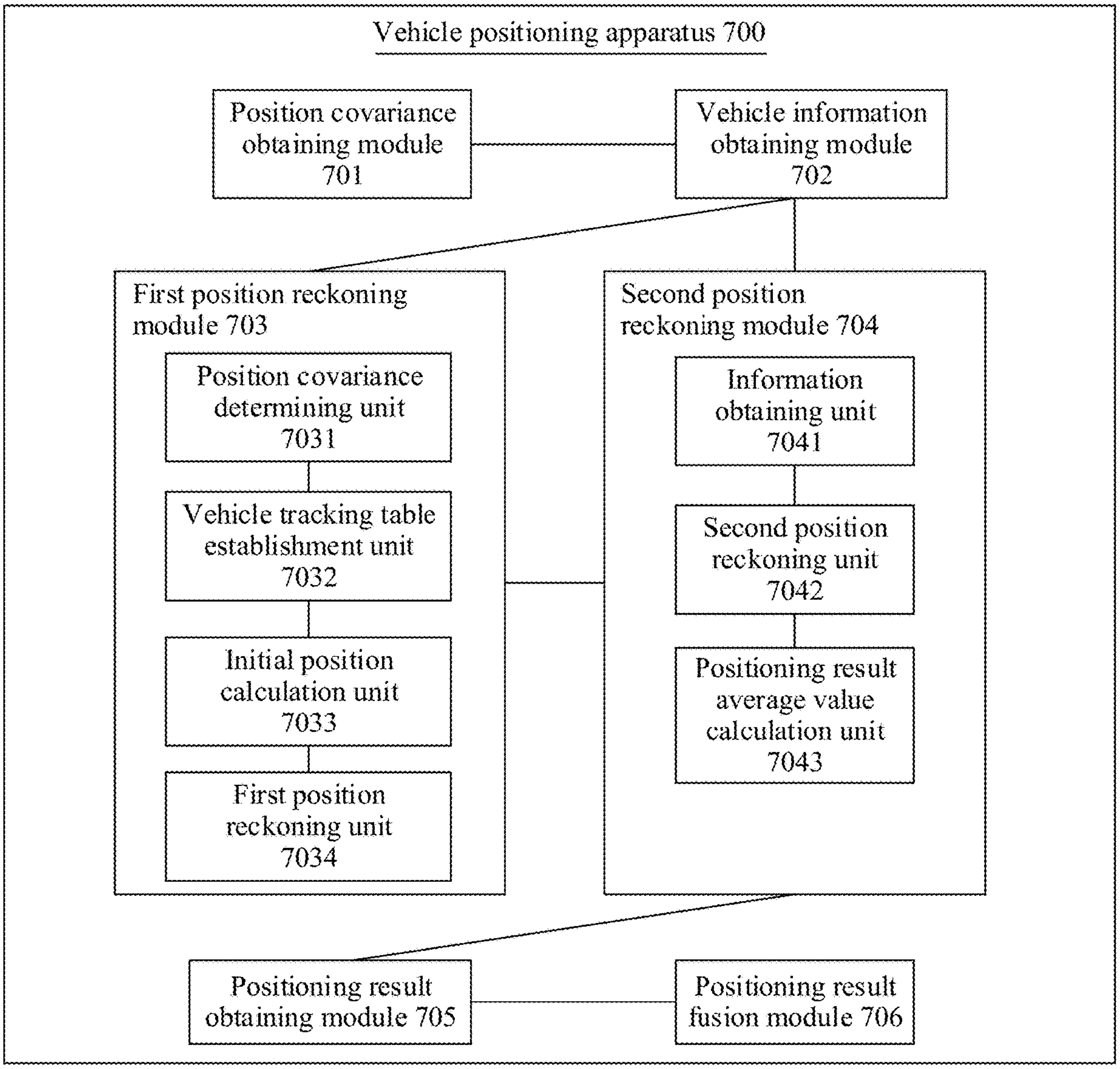
FIG. 7 is a schematic diagram of composition of another vehicle positioning apparatus according to an embodiment of this application.

FIG. 7 is a schematic diagram of composition of another vehicle positioning apparatus according to an embodiment of this application. As shown in FIG. 7, compared with the apparatus 600, modules 701 to 704 are the same as the modules 601 to 604 in the apparatus 600. In addition, the apparatus 700 may further include:

a positioning result obtaining module 705, configured to obtain a GPS positioning result and an inertial measurement unit IMU reckoning result; and a positioning result fusion module 706, configured to determine a final positioning result of the to-be-positioned vehicle based on the GPS positioning result and the IMU reckoning result and with reference to the second position reckoning result by using an extended Kalman filter.

For specific function implementations of the positioning result obtaining module 705 and the positioning result fusion module 706, refer to steps S505 and S506 in Embodiment 2 corresponding to FIG. 5. Details are not described herein again.

Figure 8:
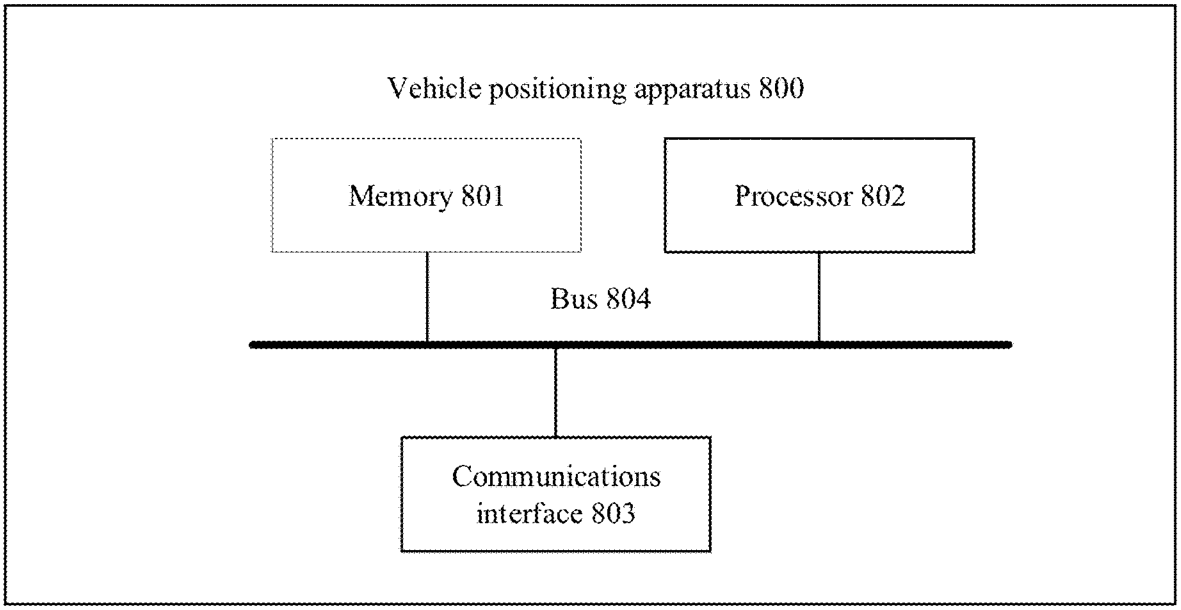
FIG. 8 is a schematic diagram of composition of a vehicle positioning apparatus according to an embodiment of this application.

FIG. 8 is a schematic diagram of composition of a vehicle positioning apparatus according to an embodiment of this application. A vehicle positioning apparatus 800 (where the apparatus 800 may be specifically a computer device) shown in FIG. 8 includes a memory 801, a processor 802, a communications interface 803, and a bus 804. The memory 801, the processor 802, and the communications interface 803 implement communication connection between each other through the bus 804.

The memory 801 may be a read-only memory (ROM), a static storage device, a dynamic storage device, or a random access memory (RAM). The memory 801 may store a program. When the program stored in the memory 801 is executed by the processor 802, the processor 802 and the communications interface 803 are configured to perform the steps of the vehicle positioning method provided in the embodiments of this application.

The processor 802 may be a general-purpose central processing unit (CPU), a microprocessor, an application-specific integrated circuit (ASIC), a graphics processing unit (GPU), or one or more integrated circuits, and is configured to execute a related program, to implement a function that needs to be performed by a unit in the vehicle positioning apparatus in this embodiment of this application, or perform the vehicle positioning method in the method embodiments of this application.

The processor 802 may be an integrated circuit chip and has a signal processing capability. In an implementation process, steps of the vehicle positioning method in this application can be implemented by using a hardware integrated logical circuit in the processor 802, or by using instructions in a form of software. The processor 802 may alternatively be a general-purpose processor, a digital signal processor (DSP), an ASIC, a field programmable gate array (FPGA) or another programmable logical device, a discrete gate or transistor logic device, or a discrete hardware component. It may implement or perform the methods, the steps, and logical block diagrams that are disclosed in embodiments of this application. The general-purpose processor may be a microprocessor, or the processor may be any conventional processor or the like. The steps of the methods disclosed with reference to embodiments of this application may be directly performed by a hardware decoding processor, or may be performed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 801. The processor 802 reads information in the memory 801, and completes, in combination with hardware of the processor 802, functions that need to be performed by the units included in the vehicle positioning apparatus in the embodiments of this application, or performs the vehicle positioning method in the method embodiments of this application.

The communications interface 803 uses, for example but not limited to, a transceiver apparatus of a transceiver type, to implement communication between the apparatus 800 and another device or a communications network.

The bus 804 may include a channel on which information is transmitted between the components (for example, the memory 801, the processor 802, and the communications interface 803) of the apparatus 800.

For specific implementation of the functional components, refer to related descriptions in the foregoing embodiments. Details are not described again in this embodiment of this application.

In another form of this embodiment, a computer-readable storage medium is provided. The computer-readable storage medium stores instructions. When the instructions are executed, the methods in the foregoing method embodiments are performed.

A person skilled in the art may understand that, for ease of description, FIG. 8 shows only one memory and one processor. An actual controller may include a plurality of processors and a plurality of memories. The memory may also be referred to as a storage medium, a storage device, or the like. This is not limited in embodiments of this application.

It should be understood that the processor in this embodiment of this application may be a CPU, or the processor may further be another general-purpose processor, a DSP, an ASIC, a FPGA, or another programmable logical device, a discrete gate or transistor logical device, a discrete hardware component, or the like.

It may be understood that the memory mentioned in embodiments of this application may be a volatile memory or a nonvolatile memory, or may include a volatile memory and a nonvolatile memory. The nonvolatile memory may be a ROM, a programmable read-only memory (PROM), an erasable programmable read-only memory (Erasable PROM, EPROM), an electrically erasable programmable read-only memory (Electrically EPROM, EEPROM), or a flash memory. The volatile memory may be a RAM and is used as an external cache. For example but not for limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that when the processor is a general-purpose processor, a DSP, an ASIC, an FPGA or another programmable logic device, a discrete gate, a transistor logic device, or a discrete hardware component, the memory (a storage module) is integrated into the processor.

It should be noted that the memory described in this specification aims to include but is not limited to these memories and any memory of another proper type.

In addition to a data bus, the bus may further include a power bus, a control bus, a status signal bus, and the like. However, for clear description, various types of buses in the figures are marked as the bus.

It should be further understood that "first", "second", "third", "fourth", and various numbers in this specification are merely used for differentiation for ease of description, and are not intended to limit the scope of this application.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

In an implementation process, steps of the foregoing methods can be implemented by using a hardware integrated logical circuit in the processor, or by using instructions in a form of software. The steps of the methods disclosed with reference to embodiments of this application may be directly performed by a hardware processor, or may be performed by using a combination of hardware and software modules in the processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

To avoid repetition, details are not described herein again.

Sequence numbers of the foregoing processes do not mean execution sequences in embodiments of this application. The execution sequences of the processes should be determined based on functions and internal logic of the processes, and should not be constructed as any limitation on the implementation processes of embodiments of this application.

A person of ordinary skill in the art may be aware that, various illustrative logical blocks (ILB) and steps that are described with reference to the embodiments disclosed in this specification may be implemented by using electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In the several embodiments provided in this application, it should be understood that the disclosed method and apparatus may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A vehicle positioning method performed by a positioning apparatus in a to-be-positioned vehicle, comprising:

obtaining a global positioning system (GPS) position covariance of the to-be-positioned vehicle;

based on the GPS position covariance being less than or equal to a preset position covariance threshold, obtaining initial position information of the to-be-positioned vehicle and vehicle information of a surrounding vehicle, wherein a distance of the surrounding vehicle from the to-be-positioned vehicle is less than a preset distance threshold, and the vehicle information comprises distance information and vehicle speed information;

determining a first position reckoning result of the surrounding vehicle based on the initial position information of the to-be-positioned vehicle, initial position information of the surrounding vehicle, including establishing a vehicle tracking table based on the vehicle information of the surrounding vehicle; wherein the vehicle tracking table includes: identification information of the surrounding vehicle, an obtaining time of the vehicle information, the initial position information, the vehicle speed information, orientation information, information about a distance between the surrounding vehicle and the to-be-positioned vehicle, and the first position reckoning result;

wherein the vehicle information of the surrounding vehicle obtained by a millimeter-wave radar sensor of the to-be-positioned vehicle; and determining a position relationship indicating whether the surrounding vehicle is in a front, rear, left, or right direction relative to the to-be-positioned vehicle by using image data captured by a vehicle-mounted camera of the to-be-positioned vehicle;

determining positive and negative values for the distance information based on the determined position relationship;

determining a second position reckoning result of the to-be-positioned vehicle based on the first position reckoning result and the determined positive and negative values for the distance information, by deducing the position of the to-be-positioned vehicle from the first position reckoning result of the surrounding vehicle, which includes subtracting the distance information having the determined positive and negative values from coordinate information of the first position reckoning result, and controlling the to-be-positioned vehicle to implement autonomous driving based on the second position reckoning result.

2. The method according to claim 1, wherein the vehicle information of the surrounding vehicle further comprises the identification information of the surrounding vehicle, the orientation information of the surrounding vehicle, and information about an angle difference between the surrounding vehicle and the to-be-positioned vehicle, and the orientation information comprises yaw angle information of the surrounding vehicle, pitch angle information of the surrounding vehicle, and roll angle information of the surrounding vehicle, the distance information comprises information about a horizontal distance between the surrounding vehicle and the to-be-positioned vehicle, and information about a vertical distance between the surrounding vehicle and the to-be-positioned vehicle, and the vehicle speed information comprises the vehicle speed information of the surrounding vehicle and yaw angular velocity information of the surrounding vehicle.

3. The method according to claim 2, wherein the determining the first position reckoning result comprises:

obtaining the initial position information of the surrounding vehicle based on the vehicle tracking table and the initial position information of the to-be-positioned vehicle by using an initial position reckoning algorithm; and obtaining the first position reckoning result based on the initial position information of the surrounding vehicle and the vehicle information of the surrounding vehicle by using a first position reckoning algorithm.

4. The method according to claim 3, wherein the first position reckoning result comprises first position reckoning coordinates ($x_{i_t}$, $y_{i_t}$, $z_{i_t}$, $yaw_{i_t}$, $pitch_{i_t}$, $roll_{i_t}$), and the first position reckoning algorithm comprises:

$$yaw_{i_t=yaw i_t-\Delta t}+yawrate_{i_t}*\Delta t;$$

$$pitch_{i_t}=pitch_{i_t-\Delta t};$$

$$roll_{i_t}=roll_{i_t-\Delta t};$$

$$x_{i_t}=x_{i_t-\Delta t}+v_{i_t}*\cos yaw_{i_t}*\Delta t;$$

$$y_{i_t}=y_{i_t-\Delta t}+v_{i_t}*\sin yaw_{i_t}*\Delta t; \text{ and}$$

$$z_{i_t}=z_{i_t-\Delta t}, \text{ wherein}$$

$x_{i_t}$, $v_{i_t}$, $z_{i_t}$, $yaw_{i_t}$, $pitch_{i_t}$, and $roll_{i_t}$ respectively represent coordinate information in a preset x-coordinate axis direction, coordinate information in a preset y-coordinate axis direction, coordinate information in a preset z-coordinate axis direction, yaw angle information, pitch angle information, and roll angle information that are of the surrounding vehicle numbered i and that are at a moment t, $x_{i_t-\Delta t}$, $y_{i_t-\Delta t}$, $z_{i_t-\Delta t}$, $yaw_{i_t-\Delta t}$, $pitch_{i_t-\Delta t}$, and $roll_{i_{t}-\Delta t}$ respectively represent coordinate information in the preset x-coordinate axis direction, coordinate information in the preset y-coordinate axis direction, coordinate information in the preset z-coordinate axis direction, yaw angle information, pitch angle information, and roll angle information that are of the surrounding vehicle numbered i and that are at the moment t−Δt, $yawrate_{i_t}$ represents yaw angular velocity information that is of the surrounding vehicle numbered i and that is at the moment t, Δt is a preset time interval, and $v_{i_t}$ represents vehicle speed information that is of the surrounding vehicle numbered i and that is at the moment t.

5. The method according to claim 2, wherein the determining the second position reckoning result comprises:

obtaining the information about the angle difference between the surrounding vehicle and the to-be-positioned vehicle, the information about the horizontal distance between the surrounding vehicle and the to-be-positioned vehicle, and the information about the vertical distance between the surrounding vehicle and the to-be-positioned vehicle; and obtaining the second position reckoning result with reference to the first position reckoning result by using a second position reckoning algorithm.

6. The method according to claim 5, wherein the second position reckoning result comprises second position reckoning coordinates ($x_t$, $y_t$, $z_t$, $yaw_t$, $pitch_t$, $roll_t$), and the second position reckoning algorithm comprises:

$$x_t=x_i-lx_{i_t};$$

$$y_t=y_{i_t}-ly_{i_t};$$

$$z_t=z_{i_t};$$

$$yaw_t=yaw_{i_t}-1yaw_{i_t};$$

$$pitch_t=pitch_{i_t};\text{ and}$$

$$roll_t=roll_{i_t},\text{ wherein}$$

$x_t$, $y_t$, $z_t$, $yaw_t$, $pitch_t$, and $roll_t$ respectively represent coordinate information in a preset x-coordinate axis direction, coordinate information in a preset y-coordinate axis direction, coordinate information in a preset z-coordinate axis direction, yaw angle information, pitch angle information, and roll angle information that are of the to-be-positioned vehicle at a moment t, $x_{i_t}$, $y_{i_t}$, $z_{i_t}$, $yaw_{i_t}$, $pitch_{i_t}$, and $roll_{i_t}$ respectively represent the coordinate information in the preset x-coordinate axis direction, the coordinate information in the preset y-coordinate axis direction, the coordinate information in the preset z-coordinate axis direction, the yaw angle information, the pitch angle information, and the roll angle information that are of the surrounding vehicle numbered i and that are at the moment t, $lx_{i_t}$ and $ly_{i_t}$ respectively represent information about a horizontal distance and information about a vertical distance between the surrounding vehicle numbered i and the to-be-positioned vehicle at the moment t, and $lyaw_{i_t}$ represents information about an angle difference between the surrounding vehicle numbered i and the to-be-positioned vehicle at the moment t.

7. The method according to claim 1, wherein before determining the first position reckoning result of the surrounding vehicle, the method further comprises:

determining whether the GPS position covariance is greater than the preset position covariance threshold, and when the GPS position covariance is greater than the preset position covariance threshold, performing the determining a first position reckoning result of the surrounding vehicle based on the initial position information of the to-be-positioned vehicle and the vehicle information of the surrounding vehicle.

8. The method according to claim 1, wherein a quantity N of surrounding vehicles is greater than 1, N vehicles of the surrounding vehicles correspond to N first position reckoning results, and the determining a second position reckoning result of the to-be-positioned vehicle comprises:

respectively determining, based on the N first position reckoning results, N second position reckoning results corresponding to the to-be-positioned vehicle, calculating a positioning result average value of the N second position reckoning results, and using the positioning result average value as a final second position reckoning result of the to-be-positioned vehicle.

9. The method according to claim 1, further comprising:

obtaining a GPS positioning result and an inertial measurement unit (IMU) reckoning result; and determining a final positioning result of the to-be-positioned vehicle based on the GPS positioning result and the IMU reckoning result and with reference to the second position reckoning result by using an extended Kalman filter (EKF).

10. The method according to claim 9, wherein after vehicle positioning information is initialized, the EKF starts to perform iteration of positioning information prediction and positioning information observation, and further obtains the final positioning result of the to-be-positioned vehicle; and wherein the positioning information observation is for performing weighted correction on a result of the positioning information prediction, so as to provide an accurate positioning result.

11. The method according to claim 1, wherein the initial position information of the surrounding vehicle comprises first initial position coordinates ($x_{i_{t0}}$, $y_{i_{t0}}$, $z_{i_{t0}}$, $yaw_{i_{t0}}$, $pitch_{i_{t0}}$, $roll_{i_{t0}}$), the initial position information of the to-be-positioned vehicle comprises second initial position coordinates ($x_{t0}$, $y_{t0}$, $z_{t0}$, $yaw_{t0}$, $pitch_{t0}$, $roll_{t0}$), and an initial position reckoning algorithm comprises:

$$x_{i_{t0}}=x_{t0}+lx_{i_{t0}};$$

$$v_{i_{t0}}=y_{t0}+ly_{i_{t0}};$$

$$z_{i_{t0}}=z_{t0};$$

$$yaw_{it_0}=yaw_{t0}+lyaw_{i_{t0}};$$

$$pitch_{i_{t0}}=pich_{t0};\text{ and}$$

$$oll_{i_{t0}}=oll_{t0},\text{ wherein}$$

$x_{i_{t0}}$, $y_{i_{t0}}$, $z_{i_{t0}}$, $yaw_{i_{t0}}$, $pitch_{i_{t0}}$, and $roll_{i_{t0}}$ respectively represent coordinate information in a preset x-coordinate axis direction, coordinate information in a preset y-coordinate axis direction, coordinate information in a preset z-coordinate axis direction, yaw angle information, pitch angle information, and roll angle information that are of a surrounding vehicle numbered i and that are at an initial moment $t_0$, $x_{t0}$, $y_{t0}$, $z_{t0}$, $yaw_{t0}$, $pitch_{t0}$, and $roll_{t0}$ respectively represent coordinate information in the preset x-coordinate axis direction, coordinate information in the preset y-coordinate axis direction, coordinate information in the preset z-coordinate axis direction, yaw angle information, pitch angle information, and roll angle information that are of the to-be-positioned vehicle at the initial moment $t_0$, $lx_{i_{t0}}$ and $ly_{i_{t0}}$ respectively represent information about a horizontal distance and information about a vertical distance between the surrounding vehicle numbered i and the to-be-positioned vehicle at the initial moment $t_0$, and $lyaw_{i_{t0}}$ represents information about an angle difference between the surrounding vehicle numbered i and the to-be-positioned vehicle at the initial moment $t_0$.

12. A vehicle positioning apparatus in a to-be-positioned vehicle, comprising:

a memory storing executable instructions; and a processor configured to execute the executable instructions to:

obtain a global positioning system (GPS) position covariance of a to-be-positioned vehicle;

based on the GPS position covariance being less than or equal to a preset position covariance threshold, obtain initial position information of the to-be-positioned vehicle and vehicle information of a surrounding vehicle, wherein a distance of the surrounding vehicle from the to-be-positioned vehicle is less than a preset distance threshold, and the vehicle information comprises distance information and vehicle speed information;

determine a first position reckoning result of the surrounding vehicle based on the initial position information of the to-be-positioned vehicle, initial position information of the surrounding vehicle, including establishing a vehicle tracking table based on the vehicle information of the surrounding vehicle; wherein the vehicle tracking table includes:

identification information of the surrounding vehicle, an obtaining time of the vehicle information, the initial position information, the vehicle speed information, orientation information, information about a distance between the surrounding vehicle and the to-be-positioned vehicle, and the first position reckoning result; wherein the vehicle information of the surrounding vehicle obtained by a millimeter-wave radar sensor of the to-be-positioned vehicle; and determine a position relationship indicating whether the surrounding vehicle is in a front, rear, left, or right direction relative to the to-be-positioned vehicle by using image data captured by a vehicle-mounted camera of the to-be-positioned vehicle;

determine positive and negative values for the distance information based on the determined position relationship;

determine a second position reckoning result of the to-be-positioned vehicle based on the first position reckoning result and the determined positive and negative values for the distance information, by deducing the position of the to-be-positioned vehicle from the first position reckoning result of the surrounding vehicle, which includes subtracting the distance information having the determined positive and negative values from coordinate information of the first position reckoning result, and control the to-be-positioned vehicle to implement autonomous driving based on the second position reckoning result.

13. The apparatus according to claim 12, wherein the vehicle information of the surrounding vehicle further comprises the identification information of the surrounding vehicle, the orientation information of the surrounding vehicle, and information about an angle difference between the surrounding vehicle and the to-be-positioned vehicle, and the orientation information comprises yaw angle information of the surrounding vehicle, pitch angle information of the surrounding vehicle, and roll angle information of the surrounding vehicle, the distance information comprises information about a horizontal distance between the surrounding vehicle and the to-be-positioned vehicle, and information about a vertical distance between the surrounding vehicle and the to-be-positioned vehicle, and the vehicle speed information comprises the vehicle speed information of the surrounding vehicle and yaw angular velocity information of the surrounding vehicle.

14. The apparatus according to claim 13, wherein the processor is configured to determine the first position reckoning result by:

obtaining the initial position information of the surrounding vehicle based on the vehicle tracking table and the initial position information of the to-be-positioned vehicle by using an initial position reckoning algorithm; and obtaining the first position reckoning result based on the initial position information of the surrounding vehicle and the vehicle information of the surrounding vehicle by using a first position reckoning algorithm.

15. The apparatus according to claim 14, wherein the first position reckoning result comprises first position reckoning coordinates ($x_{i_t}$, $y_{i_t}$, $z_{i_t}$, $yaw_{i_t}$, $pitch_{i_t}$, $roll_{i_t}$), and the first position reckoning algorithm comprises:

$$yaw_{i_t=yaw_{i_{t-\Delta t}}}+yawrate_{i_t}*\Delta t;$$

$$pitch_{i_t}=pitch_{i_{t-\Delta t}};$$

$$roll_{i_t}=roll_{i_{t-\Delta t}};$$

$$x_{i_t}=x_{i_{t-\Delta t}}+v_{i_t}*\cos yaw_{i_t}*\Delta t;$$

$$y_{i_t}=y_{i_{t-\Delta t}}+v_{i_t}*\sin yaw_{i_t}*\Delta t;\text{ and}$$

$$z_{i_t}=z_{i_{t-\Delta t}},\text{ wherein}$$

$x_{i_t}$, $v_{i_t}$, $z_{i_t}$, $yaw_{i_t}$, $pitch_{i_t}$, and $roll_{i_t}$ respectively represent coordinate information in a preset x-coordinate axis direction, coordinate information in a preset y-coordinate axis direction, coordinate information in a preset z-coordinate axis direction, yaw angle information, pitch angle information, and roll angle information that are of the surrounding vehicle numbered i and that are at a moment t, $x_{i_t-\Delta t}$, $y_{i_t-\Delta t}$, $z_{i_t-\Delta t}$, $yaw_{i_t-\Delta t}$, $pitch_{i_t-\Delta t}$, and $roll_{i_t-\Delta t}$ respectively represent coordinate information in the preset x-coordinate axis direction, coordinate information in the preset y-coordinate axis direction, coordinate information in the preset z-coordinate axis direction, yaw angle information, pitch angle information, and roll angle information that are of the surrounding vehicle numbered i and that are at the moment t−Δt, $yawrate_{i_t}$ represents yaw angular velocity information that is of the surrounding vehicle numbered i and that is at the moment t, Δt is a preset time interval, and $v_{i_t}$ represents vehicle speed information that is of the surrounding vehicle numbered i and that is at the moment t.

16. The apparatus according to claim 13, wherein the processor is configured to determine the second position reckoning result by:

obtaining the information about the angle difference between the surrounding vehicle and the to-be-positioned vehicle, the information about the horizontal distance between the surrounding vehicle and the to-be-positioned vehicle, and the information about the vertical distance between the surrounding vehicle and the to-be-positioned vehicle; and obtaining the second position reckoning result with reference to the first position reckoning result by using a second position reckoning algorithm.

17. The apparatus according to claim 16, wherein the second position reckoning result comprises second position reckoning coordinates ($x_t$, $y_t$, $z_t$, $yaw_t$, $pitch_t$, $ro_t$), and the second position reckoning algorithm comprises:

$$x_t = x_{i_t} - lx_{i_t};$$

$$y_t = y_{i_t} - ly_{i_t};$$

$$z_t = z_{i_t};$$

$$yaw = yaw_{i_t} - lyaw_{i_t};$$

$$pitch = pitch_{i_t}; \text{ and}$$

$$roll_t = roll_{i_t}, \text{ wherein}$$

$x_t$, $y_t$, $z_t$, $yaw_t$, $pitch_t$, and $roll_t$ respectively represent coordinate information in a preset x-coordinate axis direction, coordinate information in a preset y-coordinate axis direction, coordinate information in a preset z-coordinate axis direction, yaw angle information, pitch angle information, and roll angle information that are of the to-be-positioned vehicle at a moment t, $x_{i_t}$, $y_{i_t}$, $z_{i_t}$, $yaw_{i_t}$, $pitch_{i_t}$, and $roll_{i_t}$ respectively represent the coordinate information in the preset x-coordinate axis direction, the coordinate information in the preset y-coordinate axis direction, the coordinate information in the preset z-coordinate axis direction, the yaw angle information, the pitch angle information, and the roll angle information that are of the surrounding vehicle numbered i and that are at the moment t, $lx_{i_t}$ and $ly_{i_t}$ respectively represent information about a horizontal distance and information about a vertical distance between the surrounding vehicle numbered i and the to-be-positioned vehicle at the moment t, and $lyaw_{i_t}$ represents information about an angle difference between the surrounding vehicle numbered i and the to-be-positioned vehicle at the moment t.

18. The apparatus according to claim 12, wherein prior to determining the first position reckoning result, the processor is configured to:

determine whether the GPS position covariance is greater than the preset position covariance threshold, and based on the GPS position covariance being greater than the preset position covariance threshold, perform the determining a first position reckoning result of the surrounding vehicle based on the initial position information of the to-be-positioned vehicle and the vehicle information of the surrounding vehicle.

19. The apparatus according to claim 12, wherein a quantity N of surrounding vehicles is greater than 1, N vehicles of the surrounding vehicles correspond to N first position reckoning results, and the processor is configured to determine the second position reckoning result by:

respectively determining, based on the N first position reckoning results, N second position reckoning results corresponding to the to-be-positioned vehicle, calculating a positioning result average value of the N second position reckoning results, and using the positioning result average value as a final second position reckoning result of the to-be-positioned vehicle.

20. The apparatus according to claim 12, wherein the processor is further configured to:

obtain a GPS positioning result and an inertial measurement unit (IMU) reckoning result; and determine a final positioning result of the to-be-positioned vehicle based on the GPS positioning result and the IMU reckoning result and with reference to the second position reckoning result by using an extended Kalman filter (EKF).

* * * * *